(12) United States Patent
England et al.

(10) Patent No.: US 7,580,526 B2
(45) Date of Patent: *Aug. 25, 2009

(54) METHODS AND APPARATUS FOR PROTECTING SIGNALS TRANSMITTED BETWEEN A SOURCE AND DESTINATION DEVICE OVER MULTIPLE SIGNALS LINES

(75) Inventors: Paul England, Bellevue, WA (US); Andrew D. Rosen, Woodinville, WA (US); Yacov Yacobi, Mercer Island, WA (US); Gideon A. Yuval, Mercer Island, WA (US)

(73) Assignee: Microsoft Corporation, Redmond, WA (US)

( * ) Notice: Subject to any disclaimer, the term of this patent is extended or adjusted under 35 U.S.C. 154(b) by 899 days.

This patent is subject to a terminal disclaimer.

(21) Appl. No.: 11/134,111

(22) Filed: May 20, 2005

(65) Prior Publication Data

US 2005/0207577 A1 Sep. 22, 2005

Related U.S. Application Data

(63) Continuation of application No. 09/608,209, filed on Jun. 30, 2000, now Pat. No. 6,996,236.

(60) Provisional application No. 60/160,603, filed on Oct. 20, 1999.

(51) Int. Cl.
*H04K 1/00* (2006.01)
*H04N 7/167* (2006.01)

(52) U.S. Cl. .................... 380/268; 380/212; 380/213

(58) Field of Classification Search ................. 380/268
See application file for complete search history.

(56) References Cited

U.S. PATENT DOCUMENTS 5,841,863 A 11/1998 Ryan et al.
5,844,988 A 12/1998 Ryan et al.

(Continued)

OTHER PUBLICATIONS

"Enhance Display Data Channel Proposed Standard" VESA E-DDC Proposed Standard Version 1P Draft 8 pp. 1-22 Jul. 13, 1999.

(Continued)

*Primary Examiner*—Brandon S Hoffman
(74) *Attorney, Agent, or Firm*—Lee & Hayes, PLLC

(57) ABSTRACT

Methods and apparatus for protecting copyrighted information, e.g., video signals, from unauthorized use are described. Encrypted video signals are transmitted from a source device, e.g., display adapter, to a display device, e.g., monitor, over analog signal lines after the identity of the destination device is confirmed by receipt of a certificate assigned to the destination device. A session key, used for encrypting the analog signals, is generated and exchanged between the source and destination devices. The source and destination devices each include a pseudo-random number generator driven by the session key. As part of the encryption process a false video signal is generated. The false video signal and R, G, B video signals are transmitted to the display device over four lines. The lines used to transmit the R, G, B and false video signals are periodically swapped as a function of the output of the pseudo random number generator to encrypt, e.g., scramble, the video signals. To avoid having to provide an additional line between the display adapter and the display device beyond those used in conventional displays, horizontal synchronization information is combined with, e.g., modulated on, one or more of the other signals transmitted to the display. The horizontal sync line is then used to convey one of the four video signals. The display device extracts the horizontal timing information from the received video signals and decrypts the signals using the output of its pseudo random number generator to reverse the scrambling process used to encrypt the transmitted video signals.

5 Claims, 15 Drawing Sheets

U.S. PATENT DOCUMENTS 6,002,707 A     12/1999   Thue
6,486,923 B1   11/2002   Maeshima et al.
6,570,990 B1    5/2003   Kohn et al.

OTHER PUBLICATIONS

5C Digital Transmission Content Protection White Paper http://www.dtcp.com/data/wp_spec.pdf Revision 1.0 Jul. 14, 1998.

"Copy protection for high-definition baseband video" Information Technology: Coding and Computing 2000 Proceedings Intl'l. Conference on Mar. 27-29, 2000 pp. 174-177.

"SMPTE Standard for Television Audio and Film—Time and Control Code" ANSI/SMPTE 12M-1995 pp. 1-19 Sep. 12, 1995.

"Generalized Timing Formula (GTF) Standard" VESA GTF Standard Version 1.0 Revision 1.0 pp. i-27 Adoption Date: Dec. 18, 1996.

CPTWG—Copy Protection System presentation materials pp. 1-12 Dec. 15, 2998.

"Enhanced Extended Display Identification Data Proposal" VESA EEDID Proposal Release A Draft 11 pp. 1-35. Jul. 13, 1999.

"Video Scrambling & Descrambling for Satellite & Cable TV"—Second Edition 1998 Chapter 1.

$$\begin{bmatrix} R' \\ G' \\ B' \end{bmatrix} = \begin{bmatrix} -1 & 0 & 0 \\ 0 & 1 & 0 \\ 0 & 0 & 1 \end{bmatrix} \begin{bmatrix} R \\ G \\ B \end{bmatrix}$$

METHODS AND APPARATUS FOR PROTECTING SIGNALS TRANSMITTED BETWEEN A SOURCE AND DESTINATION DEVICE OVER MULTIPLE SIGNALS LINES

RELATED APPLICATIONS

This application is a continuation of and claims priority to Ser. No. 09/608,209, filed Jun. 30, 2000, now U.S. Pat. No. 6,996,236, the disclosure of which is incorporated by reference herein.

This application claims the benefit of U.S. Provisional Application No. 60/160,603, filed Oct. 20, 1999.

FIELD OF THE INVENTION

The present invention relates to methods and apparatus for transmitting and storing information and, more particularly, to methods and apparatus for discouraging, and/or protecting against, the unauthorized copying or use of the content of transmitted and/or stored information, e.g., video and/or audio signals.

BACKGROUND OF THE INVENTION

Currently, video continues to grow in importance. Video is now used for entertainment, business and educational purposes.

Consumer electronics (CE) devices such as digital video disks (DVDs), video cassette recorders, televisions, etc. are frequently used to record and/or playback video information. While many current CE video devices are analog devices such as VHS VCRs, as the cost of digital media and digital players, such as DVD players, decreases, digital CE devices are likely to replace many of the analog devices presently in use.

Theft of copyrighted information, e.g., commercial videos, is a major problem. In order to discourage the copying of, e.g., analog video cassettes, many video distributors intentionally insert noise, as a "copy protection" scheme, into a synchronization portion of the recorded signal. While this noise normally does not significantly effect the viewing of the original cassette, copying of such cassettes using conventional VCRs tends to produce a copy that contains an annoying amount of flicker. The flicker results from inaccuracies is associated with the copying process through which the noise included in the synchronization signal is much more noticeable in the copy than in the recording being copied.

Such known copy protection schemes tend to work reasonably well with current analog VCRs and television sets because such sets are designed to work with a synchronization signal that is relatively noise-free.

While CE devices are tending towards all digital embodiments, analog interfaces with computer monitors are likely to be favored over digital interfaces for quite some time. Generally, for a digital signal to accurately represent an analog video signal, the sampling rate of the digital signal must be at least twice the highest frequency component of the analog signal being represented. Accordingly, to accurately represent high frequency analog video signals, extremely high sampling rates and digital signal processing rates must be supported.

Because of the high signal processing rates that must be supported by digital monitors to display comparable video signals applied to an analog monitor, analog signal processing circuitry included in display devices has tended to be less expensive to implement than digital circuitry. For this reason, among others, analog video signals have generally been preferred to digital video signals for monitor/computer connections. Analog video signals, e.g., VGA signals, usually include, red (R), green (G), blue (B) color signals, horizontal synchronization (HS) signal, and vertical synchronization (VS) signals. Analog interconnects for such signals, e.g., monitor cables, generally include at least one line for each of the R, G, B, HS, and VS signals and at least one line for monitor plug-and-play (PP) signals. Two PP lines are common. A fifteen pin D connector has become a common connector for connecting analog monitors, e.g., VGA monitors, to computer graphics cards and adapters.

Today, many computer monitors are analog "multi-sync" monitors. Such monitors are designed to automatically synchronize to a plurality of signals of different frequencies. Because such computer monitors are designed to handle synchronization signals of multiple frequencies, they are far more flexible than conventional television sets at handling noise and/or slight frequency affects in synchronization signals. For this reason, conventional analog video copy protection techniques, such as that described above, are generally ineffective when applied to video signals supplied to analog multi-sync computer monitors.

In addition to DVDs, digital high definition televisions are likely to become common in the next few years as digital television broadcasts begin and the price of digital television sets decreases.

In order to reduce the risk of unauthorized copying of copyrighted works, several companies, including Hitachi, Ltd., Sony; Intel, and others have proposed an industry standard for digital consumer electronics devices which involves the use of authentication and key exchange procedures along with data encryption and the use of a digital communication bus which complies with IEEE standard 1394. The bus is sometimes referred to as "1394 Firewire", The proposed standard, hereinafter referred to as the "5C Standard", is discussed in the 5C *Digital Transmission Content Protection White Paper* Revision 1.0, dated Jul. 14, 1998.

The 5C standard includes several features. Four such features are:

(1) Copy control requests—A source device can request a destination device to honor copy control requests including copy-never, copy-free, and copy-once requests.

(2) Use of certificates—A destination device proves its trustworthiness to a source device by presenting a digital certificate, e.g., an authentication key, and using a corresponding private key for communications with the source device. The certificate is issued by a certifying authority that has examined the destination device to determine that it will honor the 5C Standard copy control requests.

(3) A key exchange protocol—The protocol is used by the source and destination devices once the destination device has proved that it is certified to establish a session key (content encryption key) used for encrypting copyrighted information to be exchanged.

(4) Transmission of copyrighted information in encrypted form—Information subject to copy restriction requests is transmitted in encrypted form using the session key.

In the proposed standard, a central authority is responsible for reviewing and certifying devices as complying with 5C Standard copy control requests.

FIG. 1 illustrates a conventional device 100 for implementing the 5C Standard. Device 100 includes authentication and key exchange subsystem 116, optional system renewal subsystem 114, content cipher subsystem 120, IEEE 1394 bus interface 118, storage device 112 for storing video data to be transmitted as well as received video data, and digital bus 122 which is 1394 compliant.

In this system, authentication messages, system renewal messages, authentication keys, exchange keys and session keys, in addition to encrypted data, are passed between the system i00 and other devices via the bus 122. Interface 118 is responsible for electrically interfacing between bus 122 and system elements, such as authentication and key exchange subsystem 116 content cipher subsystem 120. The authentication and key exchange subsystem 116 receives and exchanges, via bus 122, authentication and key information as well as system renewal messages. The content cipher subsystem 120 is responsible for encrypting video information prior to transmission and decoding received encrypted information using content keys provided by authentication and key exchange system 116, to the cipher subsystem 120.

Storage 112 stores un-encrypted video data, copyright status and system renewal information. The system renewal and copyright status information is provided to authentication and key exchange subsystem 116. The video residing in the storage device 112 is supplied to, or received from, the content cipher subsystem 120 which is responsible for encoding/decoding video information passed over bus 122.

In the conventional device, copy protection status information is included in an initial transmission of data between devices along with authentication information, e.g., authentication keys. Copy protection status information indicates that encrypted data can be copied freely, copied for one generation (copy-one-generation), never copied (copy-never) or is subject to a no more copies constraint (no-more-copies). An authentication key is established during authentication, which occurs at the beginning of each exchange of encrypted information between source and destination devices. The authentication key is used to encrypt an exchange key. The exchange key is used to establish and manage security of copyrighted content streams. A content (session) key is exchanged between source and destination devices in conventional device 100. The content key is used to encrypt/decrypt the content being exchanged. Authentication and key exchange subsystem 116 provides the content key, associated with a particular communication, to content cipher subsystem 120 for use in encoding/decoding the content being transmitted or received.

The 5C Standard was designed primarily for digital CE devices. A housing of such devices can normally be sealed in such a manner as to make access to the inside of the device difficult—particularly since consumers rarely need access to the insides of devices such as television sets and VCRs. Furthermore, an amount of control a consumer can have over the data processing performed by most CE devices can be limited to a set of preselected operations, e.g., play, reverse, stop, etc.

Computer owners are accustomed to having easy access to internal components of their systems for upgrading and component replacement purposes. Accordingly, in most cases it would be unacceptable to seal computer housings in such a manner as to deny the owner easy access to internal components of his(her) computer system. In addition, one strength of a personal computer is that it can run arbitrary programs that can interact at a low-level with computer hardware and an operating system. Practically, this means that if unencrypted bits flow through a computer system, often a process can be crafted to steal, e.g., copy, them.

For this reason, computers generally raise more concerns with regard to potential pirating of copyrighted information than, e.g., televisions and other CE products. Because of the ease with which copyrighted data can be copied by computer systems, it is unlikely that computer systems, e.g., personal computers (PCs), are likely to be certified as devices which implement the 5C Standard copy control requests with sufficient certainty to support issuance to it of a 5C certificate. Without such a certificate, a device will be unable to interact and exchange copyrighted information subject to copy constraints with 5C Standard CE devices. The likely inability for a computer system, as a whole, to be certified as a 5C Standard compliant device poses the threat that, in the future, computer systems will be unable to interface with many CE devices.

Another threat to computer system and CE device interoperability has been created by the film industry. A least one major film studio has threatened to refuse licensing high-resolution video if such video will be transmitted on unencrypted analog interconnects.

If copyright owners maintain such a position, it would preclude computer devices from transmitting HDTV to monitors using unencrypted analog lines. The purpose of this 5C Standard is to secure upcoming high-resolution video formats by making it difficult for individuals to connect recorders into the analog stream between a video player and the monitor. A problem with this standard is that it will increase the costs of monitors and video cards.

Unfortunately, an inability to receive certification for a computer system as 5C compliant would prevent that system from displaying copy retrieved movies and other high definition video content where the video is transmitted to a monitor using conventional unencrypted analog monitor interconnects.

In view of the above discussed threats to computer system/CE device interoperability, a need now exists for methods and apparatus that would allow a computer system, or at least a portion of a computer system, to interface and exchange data with 5C Standard devices subject to copy restrictions. In addition, a need also exists for methods and apparatus of implementing some form of encryption or scrambling of video signals on analog interconnects to address concerns of copyright owners regarding unauthorized copying of analog signals. From a commercial standpoint, it is desirable that any new methods and apparatus be at least somewhat backward compatible and be capable of being implemented at a reasonable cost.

SUMMARY OF THE PRESENT INVENTION

The present invention is directed to methods and apparatus for preventing the unauthorized copying or use of the content of transmitted and/or stored information, e.g., video and/or audio signals.

In accordance with the present invention, a display adapter and display device are capable of operating in an unencrypted mode and in an encrypted mode. During unencrypted mode operation, the display adapter provides unencrypted R, G, B video signals, a horizontal sync signal, a vertical sync signal, and a plug and play (PP) signal to the display over corresponding signal lines. The PP signal line supports bi-directional communication.

During encrypted mode operation, four encrypted video signals are transmitted to the display device as opposed to the conventional three R, G, and B video. The four encrypted video signals are generated from the three R, G, and B video signals plus a false video signal UV.

The false video signal UV may be generated in any one of a plurality of ways. To make it more difficult to distinguish the false video signal UV from a valid R, G, or B video signal, the false signal UV can be generated from one or more of the actual R, G, B video signals. For example, the false signal can be created by switching between the actual R, G, B signals according to a deliberately chaotic rule. Alternatively, the false signal can be generated by combining high frequency information from at least one of the actual R, F, B signals with a modulated pedestal signal.

In accordance with the present invention, the R, G, B and UV video signals are encrypted by performing a matrix multiplication operation thereon. A set of matrix coefficients, which are a function of the output of a pseudo random number generator, are used by the matrix multiplier when performing the matrix multiplication operation. The matrix coefficients may correspond to a permutation matrix which results in the position of the input signals being swapped on the output lines of the matrix multiplier.

The display device includes a pseudo random number generator that is synchronized with the number generator of the display adapter. A matrix multiplication operation, which is the inverse of the one performed during encryption, is performed to decrypt the encrypted video signals. The false video signal is discarded while the decrypted R, G, and B video signals are supplied to a display.

To avoid the need for an additional line between the display adapter and the display device beyond those found in conventional display cables, e.g., VGA monitor cables, the horizontal synchronization line may be used to convey the fourth encrypted video signal.

In order to free the horizontal synchronization line for use in conveying the fourth encrypted video signal, the horizontal synchronization information is combined with one of the other signals communicated from the display adapter to the display device. For example, in one case the horizontal and vertical synchronization information are combined into a single composite signal, e.g., a composite sync pulse train. The composite signal is then transmitted to the display device over the vertical synchronization signal line freeing the horizontal synchronization signal line to carry the fourth encrypted video signal.

In another case, the horizontal synchronization information is combined with one or more of the video signals being transmitted to the display device. In this regard, the horizontal blanking period of the video signal can be used to deliver data, including horizontal sync information, to the display device. Bi-phase encoding may be used to modulate the horizontal synchronization information on one or more video signals. Because the video signals will be swapped during transmission as part of the encryption process, it can be useful to incorporate the horizontal synchronization information in the four video signals being transmitted to the display. This allows the horizontal synchronization information to be extracted by monitoring any one of the four lines used to communicate video signals during encrypted mode operation.

In the case where horizontal sync information is incorporated into the video signals transmitted to a display device, a display adapter of the present invention initially provides unencrypted R, G, and B video signals including horizontal synchronization information to the display device. Horizontal and vertical synchronization information are also provided, at least initially, over the horizontal and vertical synchronization lines, respectively.

Once certification and authentication of the display device has be accomplished via the exchange of signals over the plug and play line and/or the communication of data to the display over one of the other lines, the monitor switches to using the horizontal sync data received via the video signals, the computer stops delivering conventional horizontal sync signals, and the display adapter begins to encrypt the video signals, e.g., by swapping the lines over which the R, G, B and addition false signal are transmitted.

The monitor reverts to conventional signaling, e.g., unencrypted mode operation, if it receives an explicit command to revert to unencrypted mode operation from the display adapter or if the horizontal sync data is lost for a period of time, e.g., two seconds with the ending of encrypted mode operation, the display adapter switches to providing unencrypted video signals to the display device and to providing the horizontal synchronization signal in the normal manner over the horizontal synchronization line.

Through the above discussed methods, analog video signals can be encrypted, e.g., scrambled, in a relatively inexpensive manner which provides good protection from unauthorized descrambling and use of the encrypted video signals.

BRIEF DESCRIPTION OF THE DRAWINGS

FIG. 7 illustrates a matrix multiplication operation that may be used to encrypt video signals in accordance with one exemplary embodiment of the present invention.

DETAILED DESCRIPTION

As discussed above, the present invention is directed to methods and apparatus for preventing the unauthorized copying or use of the content of transmitted and/or stored information, e.g., video and/or audio signals.

Those skilled in the art will recognize that the present invention may be effected by a wide range of devices, other than just a personal computer (PC), and particularly, specific circuitry therein. Program modules that incorporate our inventive teachings may include routines, programs, objects, components, data structures, etc. that perform a task(s) or implement particular abstract data types. Moreover, those skilled in the art will appreciate that at least some aspects of the present invention may be practiced with other configurations, including hand-held devices, multi-processor systems, microprocessor-based or programmable consumer electronics, network computers, minicomputers, set-top boxes, mainframe computers, displays used in, e.g., consumer electronics applications, automotive, aeronautical, industrial applications and the like. At least some aspects of the present invention may also be practiced in distributed computing environments where tasks are performed by remote processing devices linked through a communications network. In a distributed computing environment, program modules may be located in local and/or remote memory storage devices. Nevertheless, to facilitate understanding, we will discuss our invention in the context of various embodiments that would be used in a PC environment.

Figure 2:
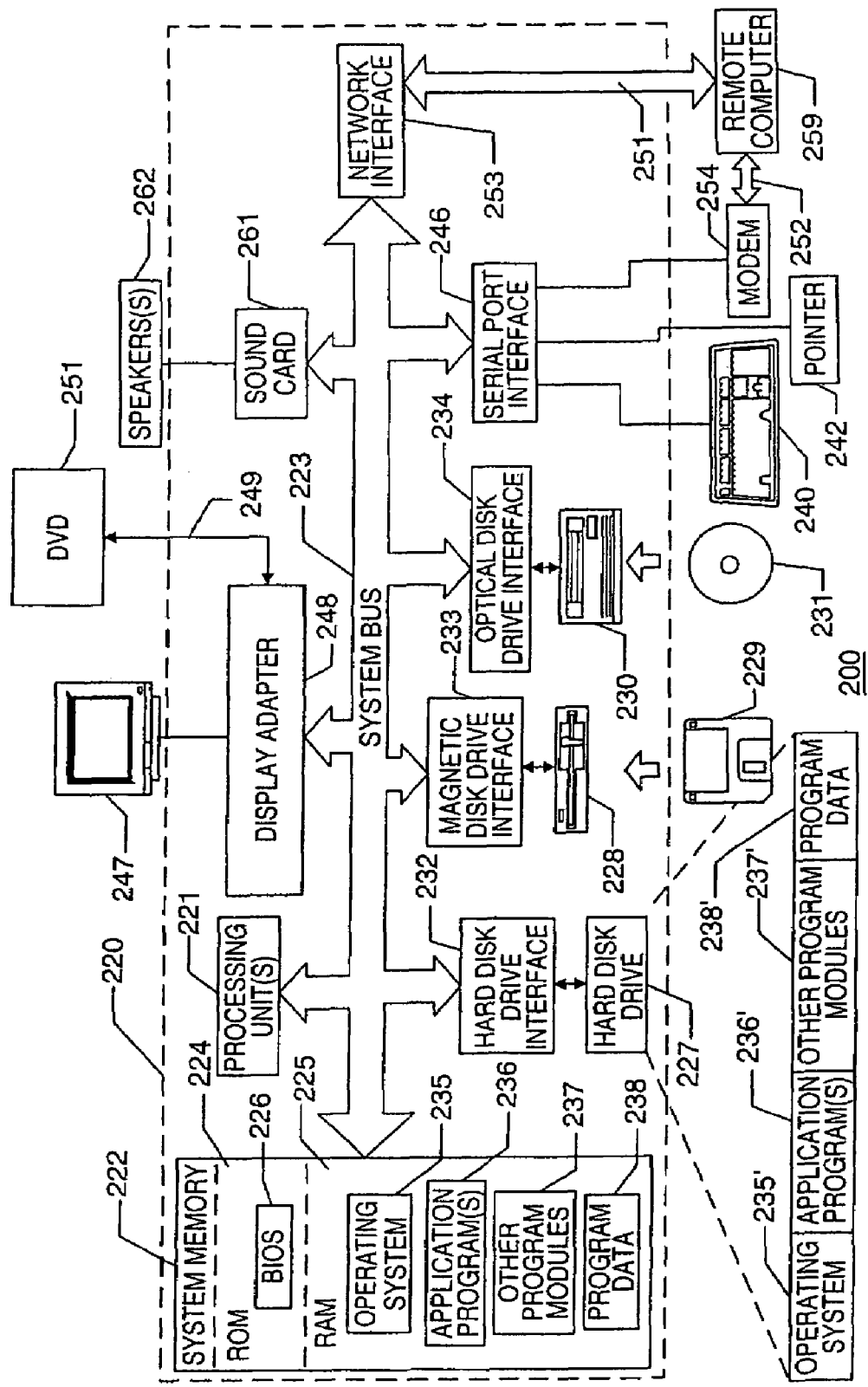
FIG. 2 illustrates a computer system implemented in accordance with one embodiment of our present invention.

FIG. 2 and the following discussion provide a brief, general description of an exemplary apparatus in which at least some aspects of the present invention may be implemented. Various methods of the present invention will be described in the general context of computer-executable instructions, e.g., program modules, being executed by a computer device such as computer system 220 or display adapter 248. Other aspects of the invention will be described in terms of physical hardware such as, e.g., display adapter circuits and display device components.

System 200 includes general purpose computing device 220 taking the form of, e.g., a PC. PC 200 may include processing unit 221, system memory 222 and system bus 223 that couples various system components including the system memory to processing unit 221. System bus 223 may be any of several types of bus structures including a memory bus or memory controller, a peripheral bus, and a local bus using any of a variety of bus architectures. The system memory may include read only memory (ROM) 224 and/or random access memory (RAM) 225. Basic input/output system 226 (BIOS), including basic routines that transfer information between elements within PC 220, such as during start-up, may be stored in ROM 224. PC 200 may also include hard disk drive 227 for reading from and writing to a hard disk (not shown), magnetic disk drive 228 for reading from or writing to (e.g., removable) magnetic disk 229 and optical disk drive 230 for reading from or writing to removable (magneto) optical disk 231, such as a compact disk or other (magneto) optical media. Hard disk drive 227, magnetic disk drive 228 and (magneto) optical disk drive 230 may be coupled with system bus 223 through hard disk drive interface 232, magnetic disk drive interface 233 and a (magneto) optical drive interface 234, respectively. The drives and their associated storage media provide nonvolatile storage of machine readable instructions, data structures, program modules and other data, e.g., video data. Although the exemplary environment described herein employs a hard disk, a removable magnetic disk and a removable optical disk, those skilled in the art will appreciate that other types of storage media, such as magnetic cassettes, flash memory cards, digital video disks, Bernoulli cartridges, random access memories (RAMs), read only memories (ROM), and the like may be used instead of, or in addition to, the storage devices introduced above.

A number of program modules may be stored on hard disk 223, magnetic disk 229, (magneto) optical disk 231, ROM 224 or RAM 225, such as, e.g., operating system 235, one or more application programs 236, other program modules 237 and/or program data 238. A user may enter commands and information into PC 220 through input devices, such as, e.g., keyboard 240 and pointing device 242. Other input devices (not shown) such as a microphone, joystick, game pad, satellite dish, scanner, or the like may also be included. These and other input devices are often connected to the processing unit 221 through serial port interface 246 coupled to the system bus. However, input devices may be connected by other interfaces, such as a parallel port, a game port or a universal serial bus (USB)—all of which are not shown.

A display device, e.g., monitor 247, implemented in accordance with the present invention is connected to system bus 223 via an interface, such as inventive display adapter 248. In addition to being coupled to monitor 247 and system bus 223, display adapter 248 is coupled to external DVD player 251 via IEEE 1394 standard digital data bus, e.g., 1394 Firewire 249. Video adapter 248 can receive encoded video via bus 249 or unencoded video via, e.g., system bus 248. Bus 249 connects video adapter 248 directly to 5C Standard compliant CE devices without having to pass encrypted information from a CE device through other computer system components.

As will be discussed below, monitor 247 is capable of interacting and exchanging identification certificates (authentication keys) and session keys, in accordance with the present invention, with video adapter 248.

In addition to monitor 247, PC 220 may include other peripheral output devices (not shown), such as, e.g., speakers and printers.

PC 220 may operate in a networked environment which defines logical connections to one or more remote computers, such as remote computer 259. Remote computer 259 may be another PC, a server, a router, a network computer, a peer device or other common network node, and may include many or all of the elements described above relative to PC 220, although only memory storage device 250 has been illustrated in FIG. 2. The logical connections depicted in this figure include local area network (LAN) 251 and wide area network (WAN) 252, which may comprise, e.g., an intranet and Internet, respectively.

When used in a LAN, PC 220 may be connected to LAN 251 through network interface card (adapter) ("NIC") 253. When used in a WAN, such as the Internet, PC 220 may include modem 254 or other means for establishing communications over the wide area network. The modem, which may be internal or external, may be connected to system bus 223 via serial port interface 246. In a networked environment, at least some of the program modules depicted relative to PC 220 may be stored in the remote memory storage device. The network connections shown are exemplary and other means of establishing a communications link between the computers may be used.

Figure 3:
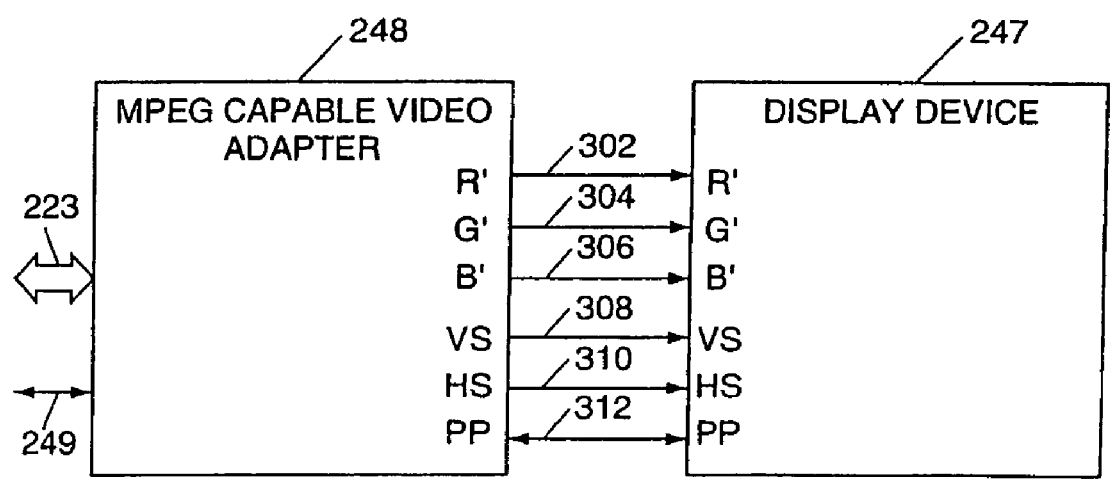
FIG. 3 illustrates a display adapter and display device coupled together in accordance with a first exemplary embodiment of the present invention.

FIG. 3 illustrates display adapter 248 and display device 247, shown in FIG. 2, embodiment coupled together in accordance with the present invention. As illustrated, video adapter 248 can receive input from either system bus 223 or 1394 Firewire 249. In addition, video adapter 248 can receive monitor identification and video decoding synchronization information from display device 247 via one or more plug and play (PP) lines 312.

Video adapter 248 can supply video information to display device 247 over a plurality of analog lines, here color signal lines 302, 304, 306; vertical synchronization (VS) signal line 308, and horizontal synchronization (HS) signal line 310. Lines 302, 304, 306, 308, 310, 312 are typically part of a single multi-wire cable having a conventional D end connection for plugging into a corresponding D connector included in an I/O interface of video adapter 248. As the result of the use of a conventional connector and pin-out arrangement, the video adapter can be connected to a conventional, e.g., VGA, monitor, or monitor 247 capable of supporting encryption.

Figure 4:
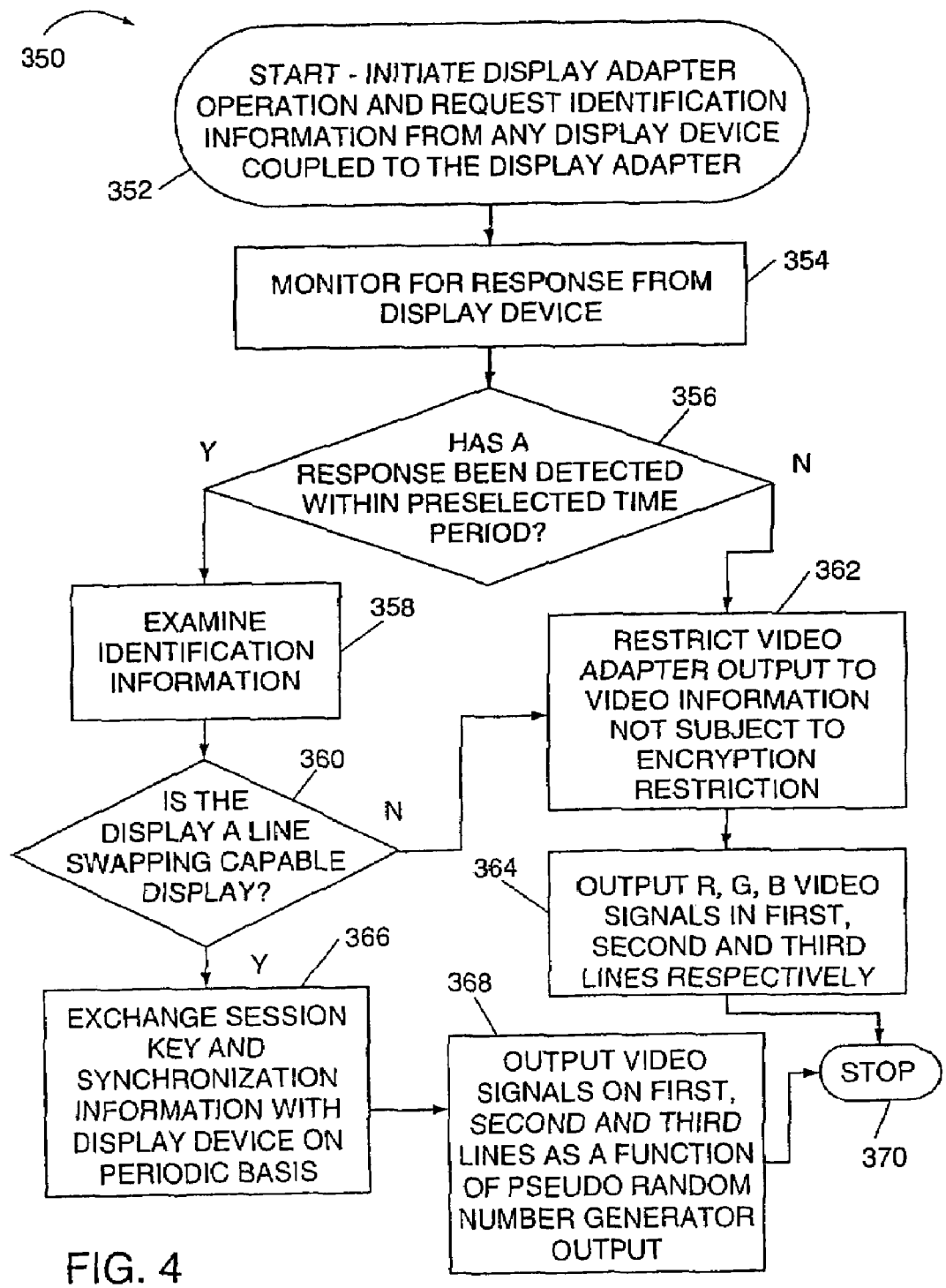
FIG. 4 depicts a flow chart illustrating the operation of our inventive display adapter.

FIG. 4 depicts flow chart 350 illustrating the operation of our inventive display adapter 248.

As shown, upon power up or re-initialization, operation of display adapter 248 begins in step 352 wherein the display adapter 248 polls any display device, coupled thereto, to request monitor identification information. The polling may be done by transmitting a request for monitor identification information to the device on any one of the lines 302, 304, 406, 308, 310 or 312 and then waiting for a response from the display device via one or both of PP lines 312.

Hence, after transmitting a request for identification information, display adapter 248 monitors, in step 354, PP lines 312 for a response from the display devices.

If a response to the request is not received in a preselected amount of time (a "timeout" interval), e.g., 1 second, as determined by decision step 356, display adapter 248 assumes that it is connected to a conventional analog display device, e.g., VGA monitor. Operation then proceeds to step 362. Through step 362, display adapter 248 restricts video output via the those analog lines (302, 304 and 306, as shown in FIG. 3) to video information which is not subject to a restriction prohibiting transmission of that information over unencrypted analog lines. From step 362 shown in FIG. 4, operation proceeds to step 364 wherein the lines 302, 304, 306 are used as R, G, and B analog video lines respectively, with analog video information being transmitted over these three lines to display device coupled to display adapter 248.

Video output occurs in step 364 until the system is reset or power is turned off causing, in step 370, operation of the display adapter to stop.

If, in step 356, a response to the request for display device identification information is detected within the timeout interval, then operation proceeds to step 358 wherein the identification information is examined. The identification information may be the same as or similar to the type used in the 5C Standard and include a digital certificate used to confirm the identity of the display device.

If the examination reveals, as determined by decision step 360, that the display device coupled to adapter 248 is not an encryption capable device, operation proceeds, via step 360, to step 362.

However, if the examination in step 358 reveals that the display device is a line swapping capable device, operation proceeds, via step 360, to step 366. This latter step periodically exchanges session key and synchronization information with the display device. This may involve, for example, the display adapter transmitting synchronization and session key information to display device 247 on one or all of the signals appearing on signal lines 302, 304, 306 during a vertical blanking period.

With the exchange of a session key, display adapter 248 is ready to produce encrypted analog video signals on signal lines 302, 304, 306 which connect display adapter 248 to display 247. These signals are produced and applied to display device 247 through step 368. The periodic exchange of session key and synchronization information, as well as the supply of encrypted video signals to display 247, which occur in steps 366 and 368, continues until operation of display adapter 248 or display device 247 halt in step 370, e.g., due to power being turned off or a re-set operation being performed.

Figure 5:
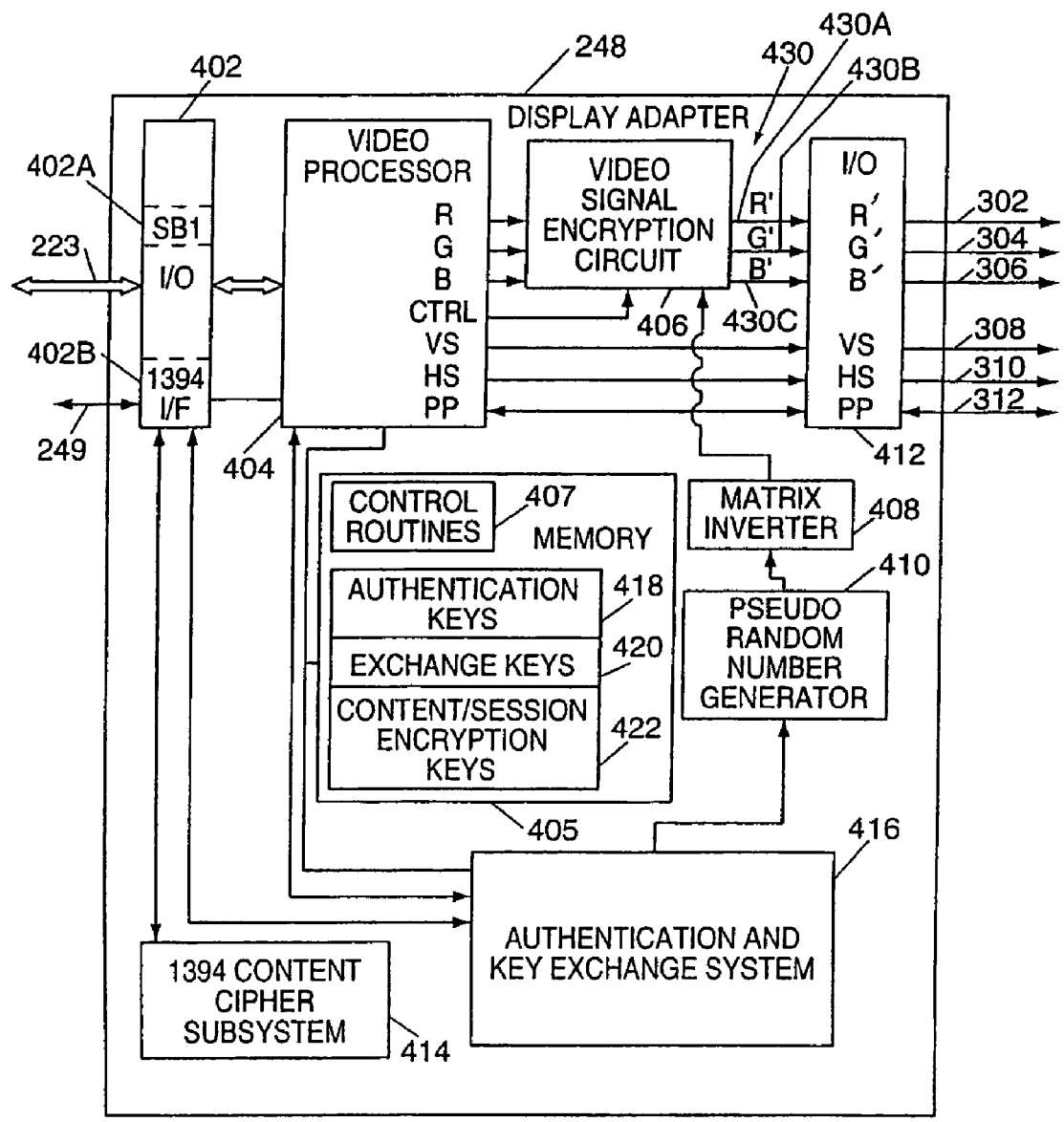
FIG. 5 illustrates our inventive display adapter of the present invention in greater detail.

FIG. 5 illustrates our inventive display adapter 248. Display adapter 248 may be implemented, e.g., as a separate plug-in card or incorporated directly into a motherboard of a computer system. As illustrated, the display adapter comprises input/output interface 402, video processor 404, video signal encryption circuit 406, I/O interface 412, memory 405, 1394 content cipher subsystem 414, authentication and key exchange system 416, pseudo-random number generator 410 and matrix inverter circuit 408 coupled together as shown. The display adapter may include optional system renewal subsystem 114 (shown in FIG. 1) coupled to authentication and key exchange subsystem 416.

I/O interface 402, shown in FIG. 5, includes system bus interface (SBI) 402A for interfacing between system bus 223 and display adapter components including video processor 404. In addition, I/O interface 402 includes IEEE 1394 interface 249 to facilitate interaction via the 1394 Firewire 249 between 5C Standard compliant devices and various components of the display adapter, e.g., 1394 content cipher subsystem 414 and authentication and key exchange system 416.

Figure 1:
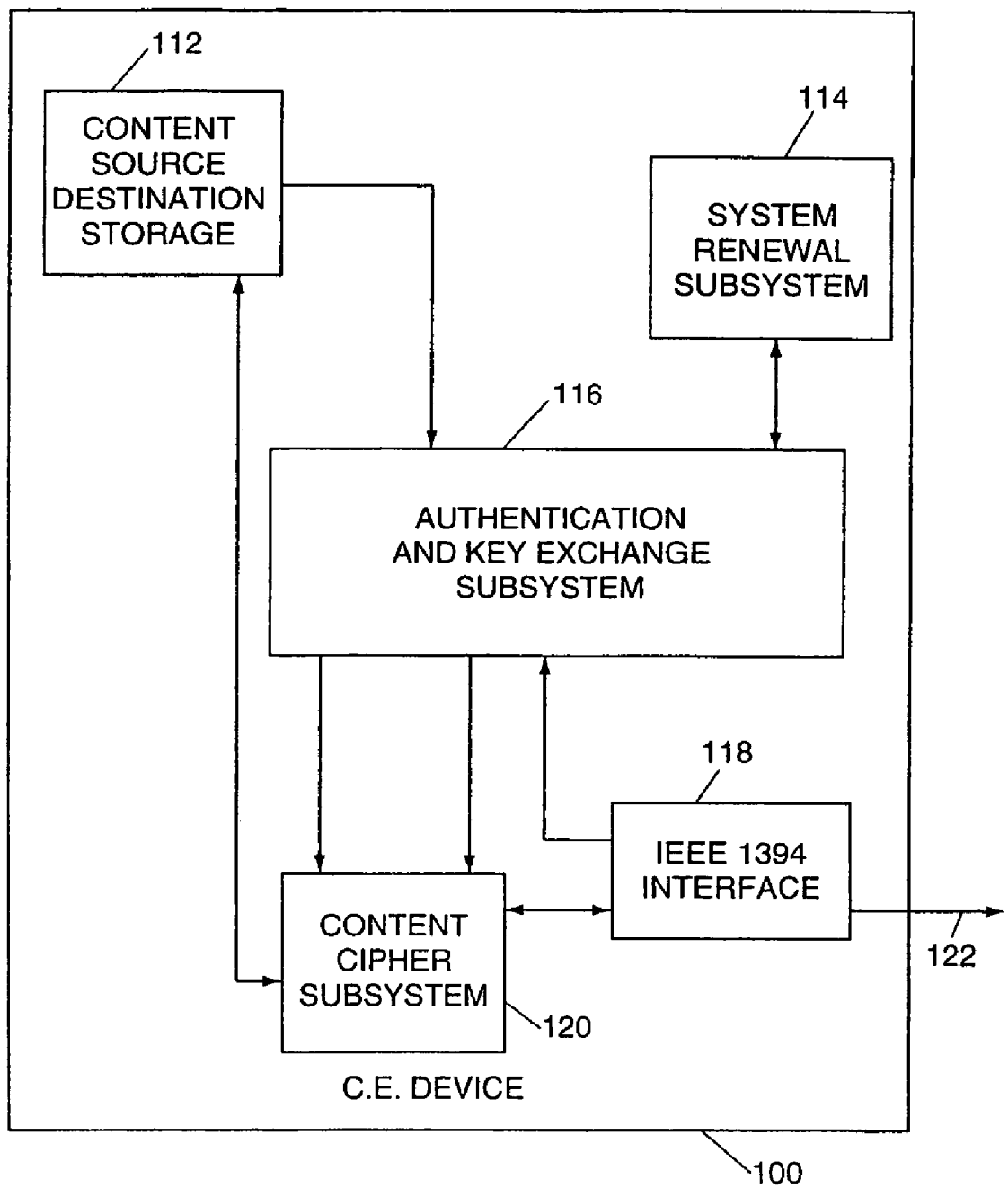
FIG. 1 illustrates a block diagram of a conventional device capable of implementing the proposed 5C standard for secure communication of information in consumer electronic devices.

1394 content cipher subsystem 414 may be the same as, or similar to, that used in conventional known device 100 (as shown in FIG. 1). Content cipher subsystem 414, receives, from authentication and key exchange subsystem 416, the content (session) key to be used for encoding/decoding information being processed during a communication session and/or information relating to the encryption algorithm to be used. The content cipher subsystem decodes encoded data received via 1394 Firewire 249. Subsystem 414 also encodes data subject to copyright restrictions in accordance with the 5C Standard prior to transmission of that date via 1394. Firewire 249.

I/O interface 402 serves to couple 1394 content cipher subsystem 414 to video processor 404 and system bus 223. Decoded video output produced by content cipher subsystem 414, copy restrictions permitting, can be transmitted over system bus 223 or processed by video processor 404. Video data processed by video processor 404 can be applied to a display via the digital matrix multiplier 406 and second I/O interface 412.

In accordance with our inventive teachings, encrypted data received via 1394 interface 402B can be stored and transmitted in encrypted form in a portion of PC 220 which is external to display adapter 248. However, to do so, the session key associated with the encrypted data would be maintained within secure display adapter 248 in, e.g., non-volatile memory 405. In this manner, the video data, being in encrypted form outside adapter 248, is thus protected, from unauthorized copying or editing. Since the display adapter stores the session key, stored encrypted video information can be played back at some future time through this adapter without compromising data security. This allows encrypted video information subject to copy restrictions to be stored safely, e.g., on hard disk 227 and later accessed, decrypted and rendered through the same display adapter. Doing so may be useful for some business and home applications where there is likely to be a delay between when copy restricted video information is received and ultimately viewed.

Note that for processing traditional non-secure video received over the 1394 Firewire, PC 200 (see FIG. 2) may edit this video information, save to disk, etc. in unencrypted form. However, when operating in secure mode, e.g., when processing information subject to copy restrictions, portions of PC 200, other than the display adapter, act as a pipe for the encrypted data and a repository for secure content.

Video processor 404, shown in FIG. 5, processes the received video signals, for performing various processing operations thereon, and controls operation of video signal encryption circuit 406. Possible signal processing operations include, e.g., decoding MPEG video data, editing data, and converting digital video data and/or images into analog red, green and blue video signals. Video processor 404 may be implemented as a digital signal processing circuit with digital-to-analog (D/A) converters for generating the analog output signals. In addition to generating the red (R), green (G), and blue (B) analog video signals, video processor 404 generates vertical synchronization signals, horizontal synchronization signals, and display information request signals, and also responds to information provided, via plug and play line 312, by the display device.

Video processor 404 is coupled to memory 405 wherein various control routines 407 are stored. The memory may also include image processing routines. The control routines control video processor operation and display interaction, e.g., in accordance with the steps 350 shown in FIG. 4.

In addition to storing control routines 407, memory 405 may store authentication keys (certificates) 418, exchange keys 420 and content/session keys 422. The authentication keys are used for proving the identity of display adapter 248 to other devices. Exchange keys are used for encrypting messages sent to devices coupled to display adapter 248. Content/session encryption keys are used for encrypting signals transmitted by the display adapter to a device coupled thereto, e.g., a 5C Standard compliant device or display device 247 that implements our inventive analog signal encryption technique.

Video processor 404 generates unencrypted R, G, and B video signals and also controls video signal encryption circuit 406 via CTRL signal.

When operating with a conventional monitor, i.e., a monitor that does not support encryption of analog video signals, the video processor limits its analog video signal output to video signals which are not subject to an analog signal encryption requirement. In such a case, video processor 404 controls video signal encryption circuit 406, via the CTRL signal, to output the R, G and B video signals without making alterations thereto. In such a case, the R, G and B video signals are output as analog video signals R', G' and B', respectively. These signals are then output via I/O interface 412 via corresponding signal lines 302, 304 and 306. I/O interface 412 may include a standard monitor connection for connecting the display adapter to conventional display devices as well as to inventive display device 247. In this manner, display adapter 248 can interact with conventional display devices.

When interacting with display device 247, video signal encryption circuit 406 is controlled by processor 404 so that the analog R, G and B video signals generated by the video processor are encrypted to generate video signals R', G' and B', respectively.

The encryption of the analog signals is performed as a function of a session key generated by authentication and key exchange system 416. The session key is used to drive pseudo-random number generator 410. The output of the pseudo-random number generator can be used directly by video signal encryption circuit 406, e.g., in the case of self inverting matrices or, alternatively, it may first be processed by matrix inverter circuit 408. The matrix inverter circuit processes the output of the pseudo-random number generator to ensure that the processing performed by video signal encryption circuit 406 will be the inverse of that performed by display device 247 when it receives the encrypted analog video signals.

In one relatively simple embodiment, the video signal encryption circuit swaps, as a function of the pseudo-random number generator output, the R, G, and B video signals to generate video signals R', G' and B'. Here, the signals on lines 430, specifically 430*a*, 430*b* and 430*c*, represent signals generated by switching the input to each line so that at any given time it is difficult to determine which of these three lines is being used to transmit the R, G, and B video signals. In such an embodiment, the R, G and B signals between the display adapter and monitor are pseudo-randomly swapped on a line-by-line basis. A session key, exchanged with the display device is used to drive pseudo-random number generator 410. Since the session key and pseudo-random number generation techniques are common to both the display adapter and display device, the display device can perform the inverse swapping operation to properly reconstruct the R, G and B video signals.

It is expected that a video pirate may attempt to decrypt analog video signals, encrypted using the above described line swapping technique, by examining the R', G' and B' video signals for inter-line correlations. To prevent the success of such an attempt, the signal on each of lines 302, 304, 306 can be composed from a keyed pseudo-random linear combination of the R, G and B incoming analog video signals supplied to video signal encryption circuit 406. As a result of such a combination, simple inter-line correlations will not reveal coefficients used during encryption which otherwise could allow the pirate to recover the original signal. Significantly, while being difficult to break, our inventive encryption scheme can be implemented using relatively inexpensive circuitry that is rather simple to manufacture.

In particular, the encryption performed on the received R, G and B video signals to generate "transformed" first (R'), second (G'), and third (B') video signals can be expressed as follows:

$$R' = a_1 R + b_1 G + c_1 B$$

$$G' = a_2 R + b_2 G + c_2 B$$

$$B' = a_3 R + b_3 G + c_3 B$$

where:
R, G and B are original color video signals;
R', G', and B' are transformed "encrypted" first, second and third video signals; and
$a_n$, $b_n$ and $c_n$ are coefficients generated using a pseudo-random number generator, e.g., generator 410, driven by a session key.

Our inventive encryption and corresponding decryption transformations may be implemented as matrix multiplication operations where all or some of the matrix coefficients are generated by, or are a function of, the output of a pseudo-random number generator driven by a session key.

Such video signal encryption and decryption may be done using either digital or analog circuitry. For example, it may be accomplished on display adapter 248 using digital circuitry implemented as part of a digital signal processor which serves as video processing circuit 404. In the display device, e.g., monitor, where little or no DSP circuitry may be present, the decrypting may be done using analog circuitry.

Use of matrix inverter 408 ensures that the encoding/decoding operations will be the inverse of one another. It may, in some cases be easier to implement matrix inverter 408 using digital signal processor circuitry rather than through analog circuitry. Accordingly, it may be desirable to incorporate matrix inverter 408 into the inventive display adapter which is more likely, than the display device, to include a digital signal processor having extra processing capacity. However, if desired, matrix inverter 408 could be included in display device 247 as opposed to display adapter 248.

In accordance with our inventive teachings, a session key is used to drive pseudo-random number generator 410. However, before a session key can be established, as discussed above with regard to FIG. 4, display adapter 248 first verifies that the receiving device is a trusted display, in contrast to a pirate video recorder, via the exchange of a certificate identifying the display device. This may be done by, e.g., transmitting information to the display device via one or more of video lines 302, 304, 306, vertical and horizontal sync lines 308, 310 and plug and play line 312. Information from the display device may be received by video processor 404 via plug and play line 312. During normal operation, session key and synchronization information may be transmitted to the display in the horizontal or vertical blanking portion of the video signals.

Verifying the identity of the receiving, e.g., display, device and establishing a session key to be used for encrypting information transmitted between display adapter 248 and our inventive display 247 is similar to the verification and session key establishment problems addressed by the 5C standard.

Advantageously, the same type of digital certificate and content key used by 5C Standard devices is used by our present invention. However, the communication between the display adapter and display is over one or more of lines 302, 304, 306, 308, 310, 312 and not 1394 Firewire. Thus, the analog encryption scheme of the present invention is well suited for use in. 5C standard devices where the establishment and exchange of session keys as part of an analog encryption session may be implemented using much of the authentication and key exchange functionality provided for 5C Standard compliance, e.g., authentication and key exchange system 416. Accordingly, our inventive analog encryption scheme is well suited for use in conjunction with, or as an enhancement to, the 5C Standard. Authentication and key exchange system 416 is coupled to video processor 404 to facilitate use of system 416 in establishing and maintaining analog video encryption sessions.

As discussed above, a session key is used to drive pseudo-random number generator 410 which generates coefficient values used during encryption/decryption. A rate at which the session key is changed affects the level of security provided. To increase the complexity of cryptoanalysis required to break the encryption, as compared to embodiments which do not modify the session key during an established communication session, a new session key can be used for each scan line of an image being transmitted to the display. For enhanced security, the session key can be modified multiple times during a single scan line thereby varying the coefficients used to encode the video signals corresponding to a scan line.

As discussed above, to eliminate a need for an inversion circuit and/or matrix inversion operation, self-inverting matrices may be used. FIG. 7 illustrates a matrix multiplication operation that may be performed by the video signal encryption circuit to encrypt R, G and a video signals. Reference numeral 602 indicates a self-inverse matrix that can be used to encrypt R, G, and B signals.

From a security standpoint, the values of the matrix used for encryption/decryption should be such that the matrix remains non-singular.

For decoding to accurately occur, display adapter and display device 247 need to be synchronized such that the correct session key is used for decoding each line of both transmitted and received video images. Synchronization should occur promptly after loss of synchronization, e.g., due to loss of power or a noise signal. One approach to maintaining synchronization is to periodically establish a new session key, e.g., every few seconds, e.g., 5 seconds.

In the event display device 247 loses power, this display device can signal the display adapter via one of plug and play lines 312 to establish a new session key.

Alternatively, the display device can actively monitor and detect loss of adapter/display synchronization. Specifically, the display adapter transmits a frame counter value to the display device during each vertical blanking period. The display device maintains its own count of received frames which it then compares to a value provided by display adapter 248. If a mismatch between the frame count provided by the display adapter and that maintained in the display device is detected by the latter, the display device signals the display adapter 248 to initiate a re-synchronization operation.

Having described our inventive video encryption method and the interaction of video adapter 248 and display device 247, we will now describe display device 247 in detail.

Figure 6:
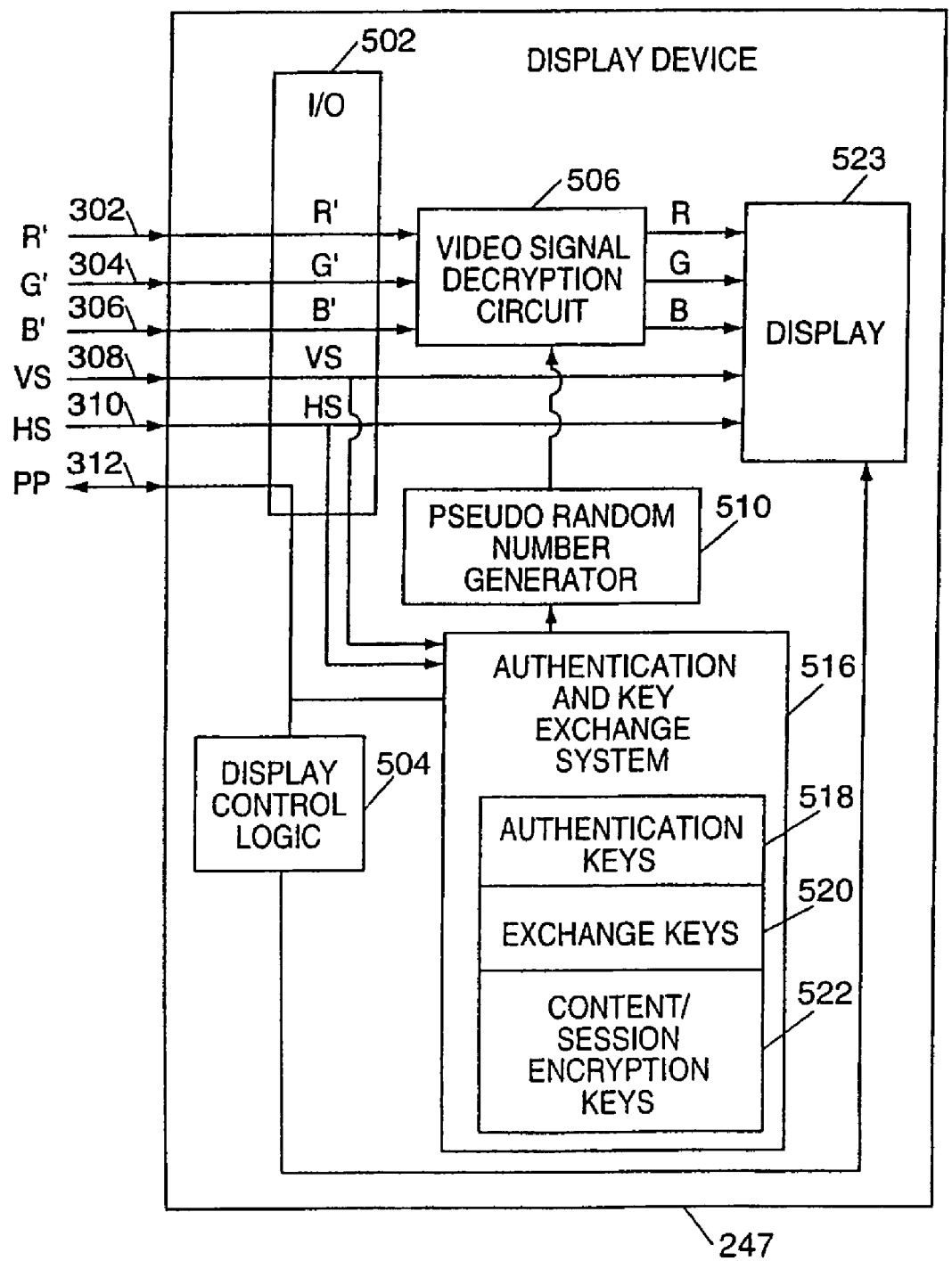
FIG. 6 illustrates display device, as shown in FIG. 2, in greater detail.

FIG. 6 illustrates an exemplary embodiment of display device 247. This device includes I/O interface 502, display control logic 504, video signal decryption circuit 506, display 523, pseudo-random number generator 510 and authentication and key exchange system 516 coupled together as shown. Display device 247 may also include (though not shown) an optional system renewal subsystem coupled to authentication and key exchange system 516.

I/O interface 502 connects various components of the display device to signal lines 302, 304, 306, 308, 310 and 312 which collectively couple display device 247 to display adapter 248. I/O interface 502 may include a standard monitor cable connector, e.g., a D connector, for line connection purposes.

Display control logic 504 controls various display operations, e.g., screen width, etc. under control of, e.g., a stored routine, located in memory (not specifically shown) situated within display control logic 504.

Control logic 504 detects synchronization loss and, in response, initiates re-synchronization. In order to detect display adapter/display device synchronization loss, display control logic 504 maintains a frame count, as discussed above, and compares that count to frame count information provided by display adapter 248. If a mis-match is detected between these frame counts, control logic 504 initiates a re-synchronization operation which involves establishment of a new session key.

Authentication and key exchange system 516 interacts with display adapter 248 and stores keys 522, 520, 518 used for decoding received data, communicating with other device and proving authenticity of display device 247. Certificates containing, e.g., authentication keys 518, are stored in a memory (also not shown) which forms part of system 516, Keys 518, 520, 522 may be stored in non-volatile tamper-resistant memory, e.g., an epoxy coated memory device, to prevent unauthorized access to these keys.

The session key established by the authentication and key exchange system serves as input to pseudo random number generator 510. The output of the pseudo-random number generator is used by the video signal decryption circuit 506 in performing a decryption operation. The pseudo-random number generator output represents matrix coefficients which are used as part of a matrix multiplication operation performed by video signal decryption circuit 506. Hence, a session key drives the pseudo-random number generators, used for encrypting and decrypting, in display adapter 248 and display 247, respectively.

Video signal decryption circuit 506 performs, as a function of the pseudo-random number generator output, inverse processing to that performed by encryption circuit 406 of display adapter 248. In this manner, the signals R', B', G' received via lines 302, 304, 306 are converted back into the unencrypted R, G, and B video signals. The unencrypted R, G and B signals are supplied, along with the vertical and horizontal synchronization signals, to display 523 which may be, e.g., a cathode ray tube (CRT) or liquid crystal display (LCD).

As discussed above, in accordance with various embodiments of the invention, analog R, G, B video signals are processed, e.g., subjected to a matrix multiplication operation, to form encrypted R', G', and B' video signals. In this manner, the lines over which the analog R, G, B signals are transmitted are varied, e.g., swapped, as the matrix coefficients used to perform the matrix multiplication operation are varied, e.g., as the output of the pseudo random number generator 510 changes.

While the swapping of the lines used to communicate the R, G, B analog video signals can make it difficult for an unauthorized individual to decrypt these signals, still greater security can be achieved by introducing an additional signal path, e.g., a fourth line, over which the R, G, B signals may be communicated to a display device. In accordance with such an embodiment, a switched pattern of analog video signals comprising R, G, B and a false video signal called UV, can be delivered over the four lines available for the communication of analog video signals.

FIGS. 8 through 17 relate to embodiments wherein four analog video signal paths are provided for communicating analog video signals between a display adapter and a display device various components in these figures operate in a manner which is the same as, or similar to, components in the previously described embodiments. Such components are identified using the same reference numerals used in the earlier figures. For the purposes of brevity, such signal components will not be described again in detail.

Figure 8:
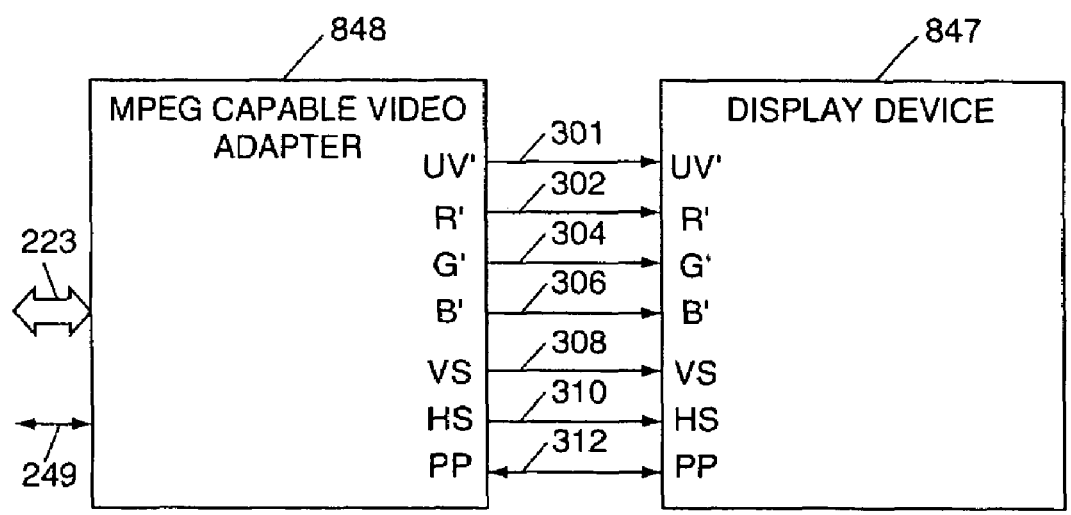
FIG. 8 illustrates a display adapter and display device coupled together in accordance with a second exemplary embodiment of the present invention.

FIG. 8 illustrates an embodiment where an additional analog video signal path, line 301, is provided between a video adapter 848 and display device 847. Thus, in addition to signal paths 302, 304, 306, the R, G, B video signals may be communicated between the video adapter and the display device 847, over signal path 301. In addition to the signal paths used to communicate the analog R, G, B signals, vertical synchronization, horizontal synchronization and plug and play lines 308, 310, 312 exist between the video adapter 848 and display device 847.

In the FIG. 8 embodiment, the particular three lines, out of the four available signal lines, which are used to transmit the R, C, B video signals at any given time can be varied as a function of the output of a pseudo random number generator in generally the same manner as previously described in the three line embodiment. However, in the 4 line embodiment a 4×4 permutation matrix as opposed to a 3×3 permutation matrix is used for encryption purposes since the signal swapping occurs over 4 lines as opposed to 3 lines.

In a four line video signal embodiment such as that shown in FIG. 8, a home recording system which captures analog video signals from only the three commonly used signal paths 302, 304, 306 would be missing one fourth of the analog image data and thus one fourth of the image "depth".

Elimination of one fourth the width of the image is a standard measure used in the traditionally recognized practice of unwanted film stock destruction. Accordingly, depriving unauthorized individuals from one fourth of the image depth is a desirable goal when encrypting analog video signals.

Figure 9:
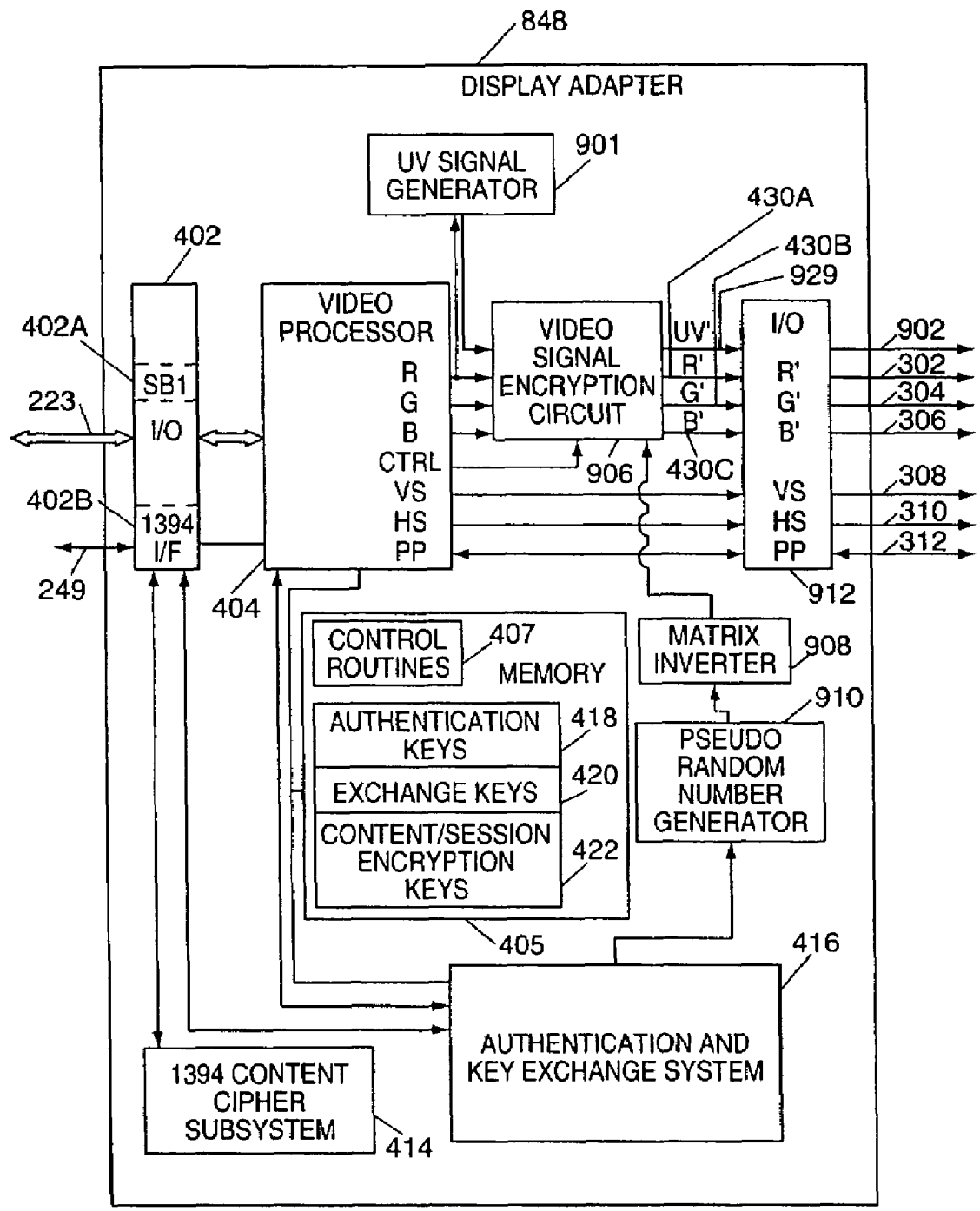
FIG. 9 illustrates the display adapter of FIG. 8 in greater detail.

FIG. 9 illustrates the video display adapter 848 of FIG. 8 in greater detail. Note that much of the display adapter circuitry shown in FIG. 9 is similar to that of the previously described display adapter 248 shown in FIG. 5 which transmits analog video data over three lines. However, the display adapter 848 includes a dummy video signal generator, a UV signal generator, 901 not present in the FIG. 5 embodiment. The FIG. 9 embodiment also includes modifications designed to support four analog video signal lines as opposed to three video signal lines. For example, in FIG. 9, a video signal encryption circuit 906 having 4 inputs and 4 outputs is used in place of the three input and three output encryption circuit of FIG. 5. The video signal encryption circuit 906 performs a matrix multiplication operation on the four analog video signal inputs, e.g., the video signals UV, R, G, and B to produce the four encrypted video signal outputs UV', R', G', and B'.

A 4×4 matrix, e.g., a 4×4 permutation matrix, is used by the video signal encryption circuit 906 when performing the encryption operation. The matrix coefficients are supplied by matrix inverter 908 and pseudo random number generator 910. The matrix inverter and pseudo random number generator 910 operate in a similar manner as to the like named circuits of FIG. 5 but they are designed to work with 4×4 matrix values as opposed to 3×3 matrix values. Thus, during each period in which a set of matrix coefficients are used, the matrix inverter 908 and pseudo random number generator 910 generate 16 values, e.g., corresponding to the 16 coefficients of a 4×4 matrix used by the video signal encryption circuit.

As in the case of the previously described embodiment, the pseudo random number generator 910, is driven by the output of the authentication and key exchange system 416.

In the FIG. 9 embodiment, an input/output (I/O) interface 912 having four analog video signal inputs and outputs, in addition to vertical synchronization signal, horizontal synchronization signal, and plug and play (PP) inputs and outputs couples the video signal encryption circuit 906 and video processor 404, to the corresponding analog signal lines 902, 302, 304, 306, 308, 310, 312.

The false video signal UV can be generated in accordance with the present invention in any one of several ways. In one embodiment the analog signal UV is set to a signal value which will produce a blank gray field. In an alternative embodiment, the signal UV is set to values representing geometric patterns with high intensities. While both exemplary false signals will have annoying effects if used with the real signals to generate an image, the false signal may detectable by comparing its signal values to the signals on the other analog signal lines. This is because the content of the signal UV is independent of the actual R, G, B signal values which tend to have some relationship to each other since they correspond to the same image.

To further strengthen the encryption signal from attach, the UV signal may be generated by switching among the valid R, G, B signals following a deliberately chaotic pattern. In one such embodiment, the false signal UV is generated by switching between the valid R, G, B signals once or twice during the transmission of each horizontal line of image data. The resulting false signal UV causes an image displayed using the signal to look bad while being difficult to electronically discriminate from the valid signals.

An even "uglier" false signal UV, which is difficult to detect, can be generated by combining the high frequency information, e.g., signal information above 0.75 MHz, from a valid R, G, or B signal with a modulated pedestal signal. An obnoxious looking pedestal signal would be a "wobble" pattern varying between one half and four Hz. In such an embodiment, with each cycle of the pedestal signal, the false signal UV will normally pass through the range of average intensity values used by the valid R, G, B signals. This makes it difficult to distinguish the false signal UV from the valid R, G, B signals.

Figure 10:
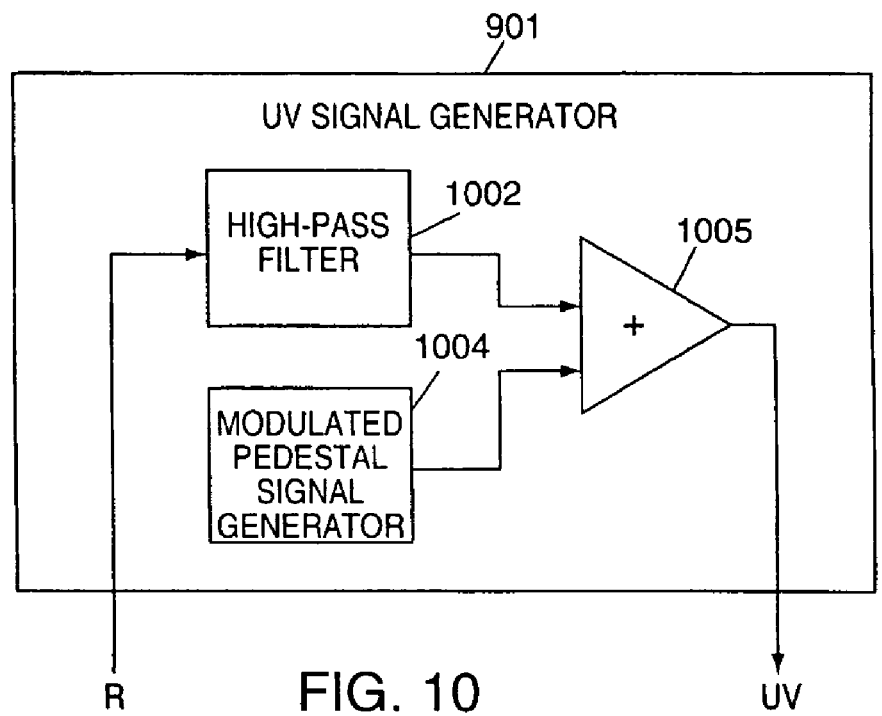
FIG. 10 illustrates a signal generator, which may be used in accordance with the present invention, to generate a dummy analog video signal.

FIG. 10 illustrates an exemplary UV signal generator 901. In the FIG. 10 embodiment, the UV signal generator 901 includes a high pass filter 1002, a modulated pedestal signal generator 1004 and a signal summer 1006. The high pass filter 1002 receives as its input one of the valid R, G, or B video signals, e.g., the R signal. The high pass filter 1002 outputs a signal representing the high frequency signal component of the valid R signal component which is supplied to a first input of analog signal adder 1006. The modulated pedestal signal generator 1004 generates a modulated pedestal signal which is supplied to the second input of adder 1006. The adder 1006 combines the high frequency signal component of a valid analog video signal with the pedestal signal generated by the pedestal signal generator 1004 to generate the false signal UV.

Figure 11:
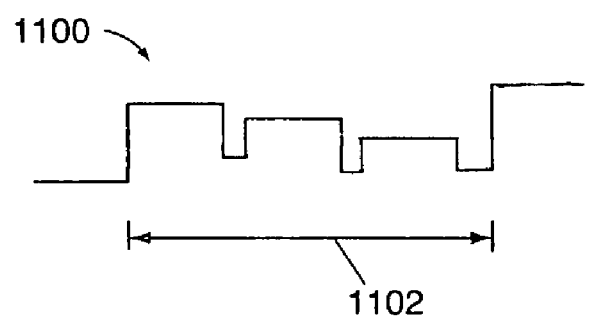
FIG. 11 illustrates an exemplary modulated pedestal signal which may be generated by the modulated pedestal signal generator shown in FIG. 10.

FIG. 11 illustrates an exemplary pedestal signal 1100 which may be generated by the modulated pedestal signal generator 1004. Note that the pedestal signal includes steps of varying sizes which repeat at the end of the period 1102. While only 3 steps are shown in FIG. 11, a large number of steps, e.g., in excess of 1000, may occur during each period.

Figure 12:
FIG. 12 illustrates an exemplary dummy video signal which may be generated by the signal generator shown in FIG. 10.

FIG. 12 illustrates an exemplary false signal UV generated by the UV signal generator 901. Note the signal 1200 includes the high frequency signal component of the R signal modulated on the pedestal signal illustrated in FIG. 12.

The encrypted analog video signals, including the false signal UV, are transmitted over the four wires 902, 302, 304, 306 to the display device 847 of the present invention.

Figure 13:
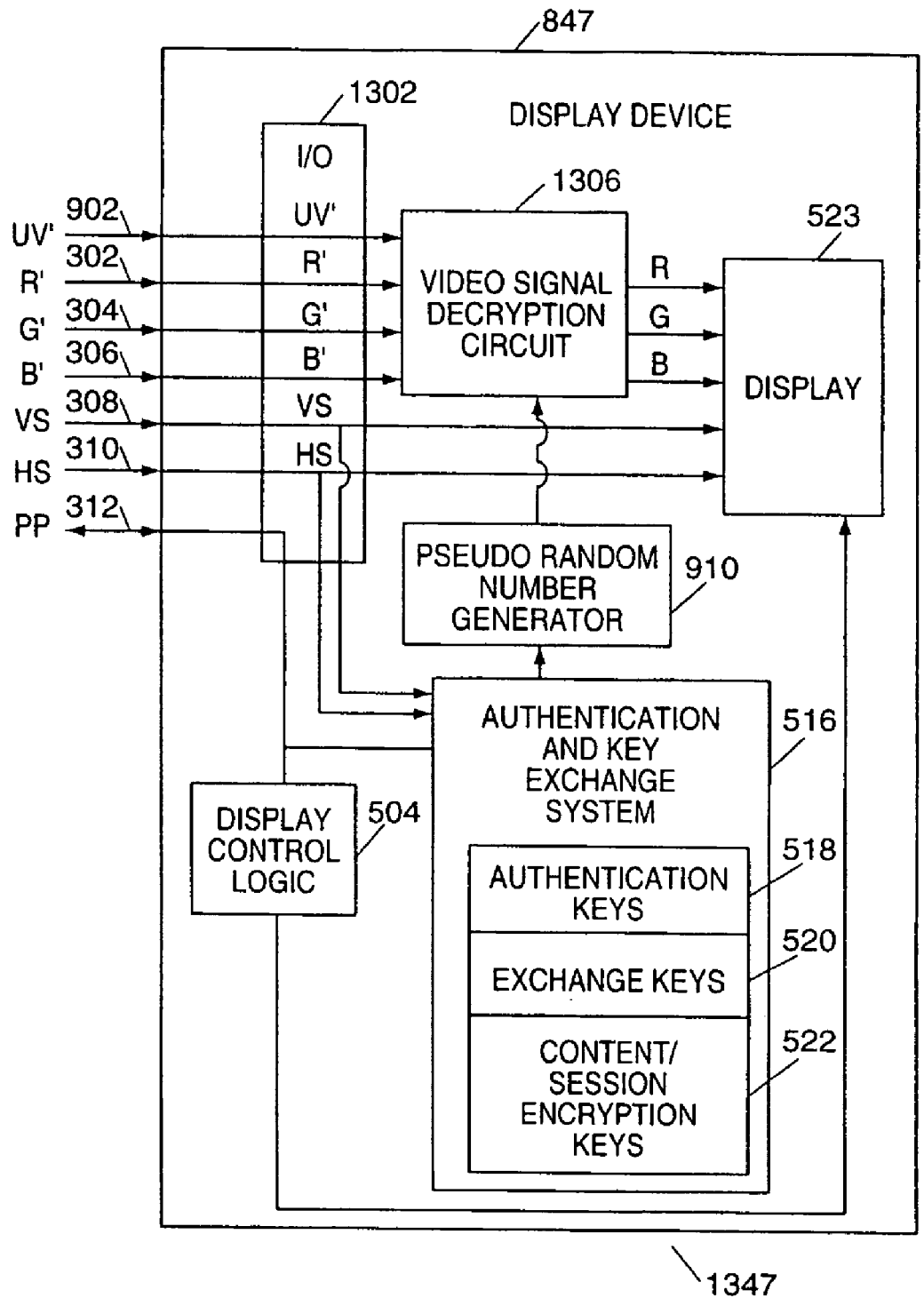
FIG. 13 illustrates an exemplary display device suitable for use as the display device shown in FIG. 8.

FIG. 13 illustrates a display device 847 suitable for decrypting and displaying the encrypted analog video signals transmitted using four wires. Many of the components of the FIG. 13 display device are the same as those of the display device 247 illustrated in FIG. 6. Such components are identified using the same reference numbers as in FIG. 6 and will not be discussed again in detail. The display device 847 differs from the display device 247 in that it includes an I/O interface 1302 which is capable of handling the additional analog signal line 902 it also differs from the display device 247 in that the pseudo random number generator 1310 generates values representing the coefficients of a 4×4 matrix as opposed to a 3×3 matrix as in the case of display device 247.

The display device 847 includes a video signal decryption circuit 1306 which receives as its input the four encrypted analog signals UV', R', G', B' and the matrix coefficient values generated by the pseudo random number generator 910. The video signal decryption circuit 1306 performs a 4×4 matrix multiplication operation on the received encrypted video signals using the values received from the pseudo random number generator 910 as matrix coefficients The matrix multiplication operation performed by the video signal decryption circuit 1306 is the inverse of the multiplication operation performed at encryption time. In this manner, the video signal decryption circuit 1306 produces the unencrypted R, G, B analog video signals from the received encrypted video signals. The decrypted analog R, G, B video signals are supplied to the display device 523 to be displayed.

While the false signal UV may also be produced by the video signal decryption circuit, since this signal is not used to generate the displayed image, it is discarded, e.g., not output by the decryption circuit 1306.

In the FIG. 13 embodiment, the plug and play signals, vertical synchronization signals, and horizontal synchronization signals are transmitted over separate communications lines 312, 308, 310 in the customary manner. Thus, a total of seven, as opposed to the customary 6, communications lines are required to support the four wire video-signal communication embodiment illustrated in FIG. 8.

The use of an additional video signal line, e.g., a fourth video signal line, will require the use of a cable between the display adapter and display device which is different then those currently in use, e.g., standard VGA cables, assuming that the other video adapter/display device interconnects remain unaltered.

From a backwards compatibility standpoint, it is desirable that in at least some embodiments, four lines be capable of being dedicated to the communication of analog video signals while still allowing traditional VGA monitor cables to be used to connect the display adapter to the display device.

Traditional VGA monitor cables used to connect display adapters of existing computer systems to monitors include five high frequency shielded lines or cores plus a line for the plug-and-play signal path. Three of the shield lines are normally used for the analog R, G, B signals while the fourth and fifth shield lines are used for the vertical and horizontal synchronization signals, respectively.

In accordance with one embodiment of the present invention, while operating in encrypted mode, one of the vertical and horizontal synchronization lines is freed for use as the fourth analog video signal line. While operating in unencrypted mode, the video signal lines are used in a conventional manner. The freeing of a horizontal or vertical synchronization line is performed by combining the lines synchronization functions with one of the other signal lines.

In one embodiment of the present invention, the function performed by the horizontal and vertical sync signals are combined in the display adapter to form a composite sync pulse train which is then transmitted over a single one of the vertical and horizontal synchronization lines to the display device. The display device decodes the received sync pulse train into separate horizontal and vertical synchronization signals which are then used in the same manner as the conventional horizontal and vertical synchronization signals.

Accordingly, in such an embodiment, the separate line 902 for the signal UV' is eliminated and, during encrypted mode operation, one of the lines 308, 310 is used to communicate the fourth analog video signal UV' while the other one of the lines 308, 310 is used to convey the combined horizontal and vertical sync pulse train. During unencrypted mode, the horizontal and vertical signals are transmitted over lines 308, 310 in a conventional manner.

Figure 14:
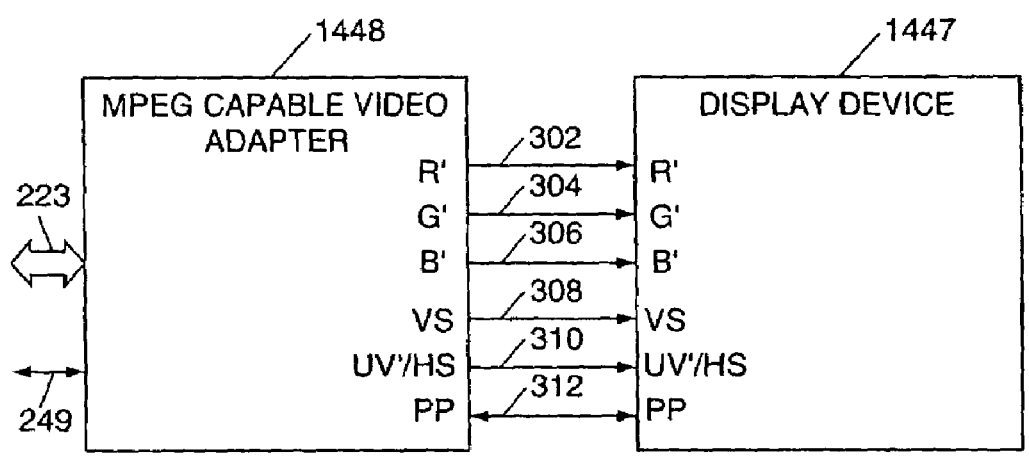
FIG. 14 illustrates a display adapter and display device coupled together in accordance with a third exemplary embodiment of the present invention.

FIG. 14 illustrates another embodiment of the present invention wherein a video adapter 1448 is coupled to a display device 1447 via six signal lines 302, 304, 306, 308, 310, 312. Because six signal lines are used for coupling the video adapter 1448 to the display device 1447, a conventional VGA monitor cable can be used for this purpose facilitating backwards compatibility with display devices which do not support encryption.

In the FIG. 14 embodiment, during encrypted mode operation, horizontal synchronization information is combined with one or more of the other video signals, e.g., the R, G, and/or B video signals, transmitted to the display device 1447. This frees the horizontal synchronization line 310 to be used, during encrypted mode operation, to transmit the encrypted fourth video signal UV'. During unencrypted mode operation, the horizontal synchronization signal is communicated over the line 310 in the normal fashion. To indicate that line 310 is used to communicate the encrypted signal UV' during encrypted mode operation and the horizontal synchronization signal HS during unencrypted mode operation, the label UV'/HS is used in FIG. 14 at both ends of line 310.

Figure 15:
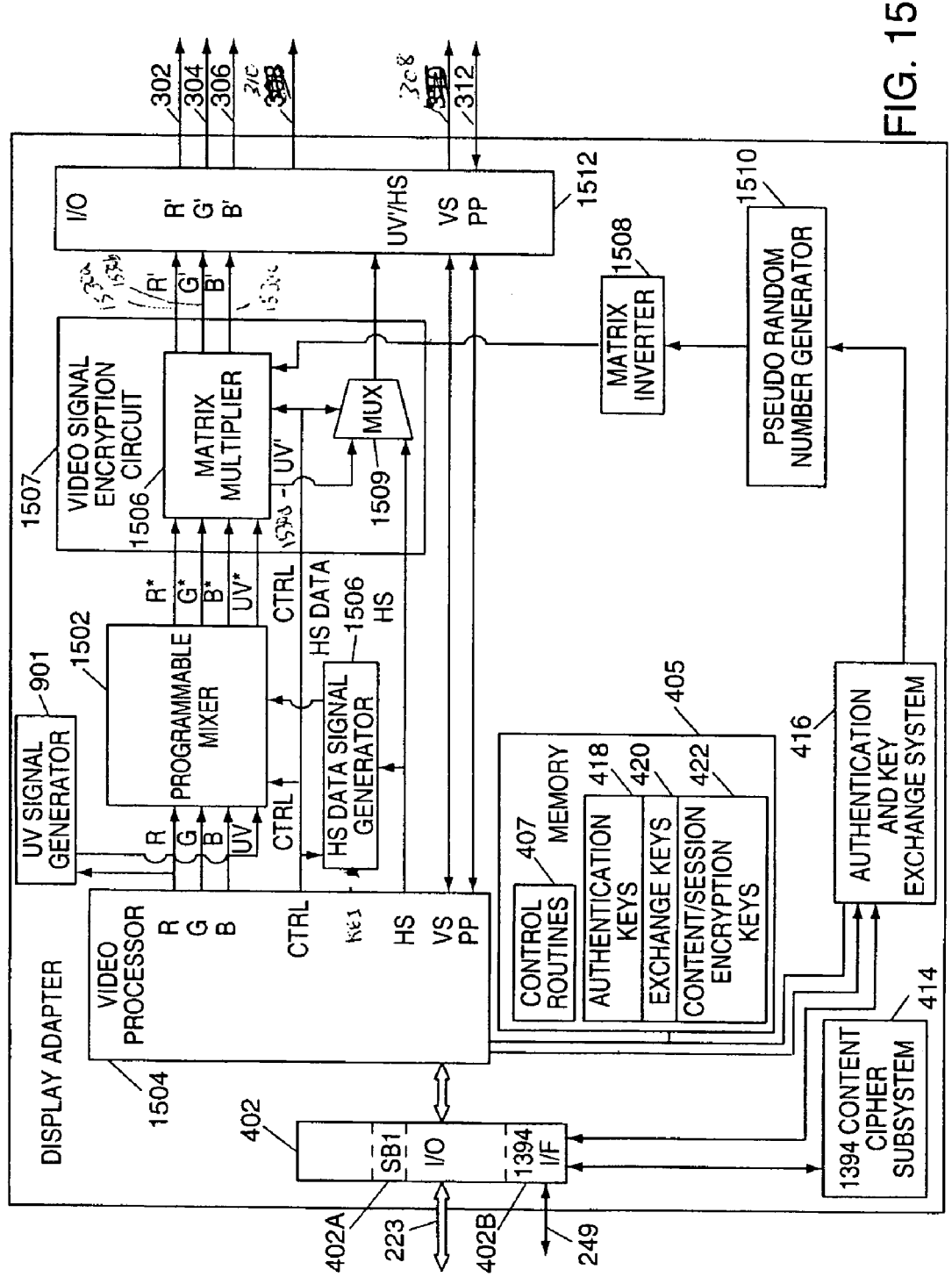
FIG. 15 illustrates the display adapter of FIG. 14 in greater detail.

FIG. 15 illustrates the display adapter 1448, of FIG. 14, in greater detail. The display adapter 1448 includes many components, such as the interface 402, 1394 content cipher subsystem 414, memory 405, authentication and key exchange system 416 which are the same as, or similar to the like named and numbered elements previously discussed in regard to FIG. 5. For the purposes of brevity such components will not be discussed again.

In addition to the above mentioned components, the display adapter 1448 includes a video processor 1504, UV signal generator 901, programmable mixer 1502, horizontal synchronization (HS) data signal generator 1506, pseudo random number generator 1510, matrix inverter 1508, video signal encryption circuit 1507 and an input/output (I/O) interface 1512. The video signal encryption circuit 1507 includes a matrix multiplier 1506 and a MUX 1509.

Video processor 1504, processes the video data, received via bus 223 and/or bus 249, and generates the R, G, and B analog video signals from the received video data. The processor 1504 also receives information from the display device to which it is coupled via a plug and play connection and interacts with the authentication and key exchange system 416. In addition to generating the R, G, B analog video signals, the video processor generates a vertical synchronization signal (VS) and control signal (CTRL). The control signals are used to control operation of the programmable mixer 1502, HS data signal generator 1506 and video signal encryption circuit 1507, e.g. to enable/disable signal encryption and to enable/disable the insertion of horizontal synchronization information into the R, G, B video signals.

The control signals CTRL also include timing information, e.g., a clock signal, used to synchronize operations performed by various components of the display adapter 1448.

Signal processing operations which may be performed by the video processor 1504 include, e.g., decoding MPEG video data, editing data, and converting digital video data and/or images into analog red, green and blue video signals. Video processor 1504 may be implemented as a digital signal processing circuit with digital-to-analog (D/A) converters for generating the analog output signals. In addition to generating the red (R), green (G), and blue (B) analog video signals, video processor 404 generates display information request signals, and also responds to information provided, via plug and play line 312, by the display device.

Video processor 1504 is coupled to memory 405 wherein various control routines previously discussed with regard to FIG. 5 are stored.

When operating with a conventional monitor, i.e., a monitor that does not support encryption of analog video signals, the video processor 1504 limits its analog video signal output to video signals which are not subject to an analog signal encryption requirement. In such a case, video processor 1504 controls video signal encryption circuit 1507, via the CTRL signal, to output the R, G and B video signals without making alterations thereto. In addition, during unencrypted mode operation, the processor 1504 controls the video signal encryption circuit 1507 to output the horizontal synchronization signal HS, generated by the video processor, so that it is supplied to the display device on line 310.

In this manner, during unencrypted mode operation, the R, G, B video signals and vertical and horizontal synchronization signals are transmitted to the display device in a conventional manner allowing a conventional display device to receive and display video information from the display adapter 1448.

The video processor 1504 can detect via the plug and play line, when it is interacting with a display device of the present invention, e.g., display device 1447, as opposed to a conventional display device. When interacting with display device 1447 of the present invention, video signal encryption circuit 1507 is controlled by processor 404 so that video signal encryption will be performed on the analog R, G and B video signals generated by the video processor. In addition, the video processor 1504 enables the HS data signal generator 1506 and programmable mixer so that the horizontal synchronization information will be incorporated into each of the R, G, B video signals and the false video signal UV. By incorporating the horizontal synchronization information into the video signals, the horizontal synchronization line 310 can be used for transmitting the fourth encrypted video signal UV'.

The HS data signal generator is responsive to the control signal CTRL from the video processor 1504 and receives as its input, the horizontal synchronization signal HS generated by the video processor 1504. Optionally, the HS data signal generator 1506 may also receive key encryption information (KEI) to be transmitted to the display device.

During encrypted mode operation, the HS data signal generator 1506 is enabled by the video processor 1504. The HS data signal generator 1506 generates, from the horizontal synchronization signal produced by the video processor, a horizontal synchronization (HS) data signal which can be mixed with the analog video signals to form a video signal which includes horizontal information. The generated HS data signal is supplied to a corresponding data input of the programmable mixer 1502.

UV video signal generator 901 generates a false video signal from the R video signal as previously discussed. Alternatively, the false video signal UV can be generated in any one of a number of different ways.

The programmable mixer 1502 receives as its input, the R, G, B analog video signals and the false video signal UV generated by UV signal generator 901.

During encrypted mode operation, the programmable mixer 1502 modulates the received horizontal synchronization data on each of the analog R, G, B and UV video signals to produce modulated video signals R*, G*, B*, UV*. The programmable mixer 1502 inserts into each horizontal blanking period a burst of bi-phase encoded data obtained from the HS data signal generator 1506. The leading edge of a horizontal sync signal may be defined as the beginning of the first data byte following an encoded bi-phase sync word. For any given mode with N cycles of sync word, it is desirable that horizontal sync pulse validity be gated by a count of N sync word cycles.

Thus, in the FIG. 15 embodiment each of the modulated video signals include the same horizontal synchronization information. Optionally, key encryption information included in the HS data may also be modulated on the video signals.

The modulated video signals R*, G* B* and UV* are supplied to the video signal encryption circuit 1507 and the matrix multiplier 1506 included therein. The matrix multiplier 1506 also receives as an input a 4×4 set of matrix coefficients, e.g., 16 matrix coefficients.

In one relatively simple embodiment, the matrix multiplier 1506 swaps, as a function of the pseudo-random number generator output, the R, G, and B and UV video signals to generate video signals R', G' B' and UV' encrypted video signals. The signal swapping is performed through implementation of the matrix multiplication operation and the use of matrix coefficients which correspond to a permutation matrix. In such an embodiment, the signals on lines 1530a,

1530b, 1530c, and 1530d, represent signals generated by switching the input to each line so that at any given time it is difficult to determine which of these four lines is being used to transmit the modulated R*, G*, B* and UV* video signals.

In one such embodiment, the lines used to communicate the R*, G*, B* and UV* signals between the display adapter and monitor are pseudo-randomly swapped on an image line by image line basis for the signals R', G', B' UV'. As in the case of the FIG. 5 embodiment, a session key, exchanged with the display device is used to drive the pseudo-random number generator, e.g., number generator 1510. Since the session key and pseudo-random number generation techniques are common to both the display adapter and display device, the display device can perform the inverse swapping operation to properly reconstruct the R, G and B video signals.

The matrix coefficients supplied to the matrix multiplier 1506 are generated as a function of a value produced by the authentication and key exchange system. In the illustrated embodiment, the authentication and key exchange system 416 controls the pseudo random number generator to periodically generate a set of matrix coefficients. The coefficients, in the case of self inverting matrix coefficients, are supplied directly to the matrix multiplier 1506. In the illustrated embodiment, the output of the pseudo random generator 1510 is not limited to being self inverting matrix coefficients. Accordingly, before being supplied to the matrix multiplier 1508, each generated set of, e.g., 16, matrix coefficients are subjected to a matrix inversion process performed by the matrix inverter 1508. By performing the matrix inversion operation in the display adapter 1448, the need to perform an inversion operation in the display device is avoided.

The matrix multiplier 1507 performs a matrix multiplication operation on the modulated analog video signals input thereto to produce four encrypted analog video signals R', G' B' and UV'. The multiplication operation may be implemented using analog signal, multipliers and adders. The R', G' and B' encrypted video signals are supplied, via I/O interface 1512 to the corresponding lines 302, 304, 306.

The fourth encrypted video signal UV', generated by the matrix multiplier 1506, is supplied to a first input of MUX 1509. The second input of the MUX 1509 is supplied with the horizontal synchronization signal HS generated by the video processor 1504.

During encrypted mode operation, the MUX 1509 is controlled by the control signal CRTL to output the encrypted fourth video signal UV'. During unencrypted mode operation the MUX 1509 is controlled by the control signal CTRL to output the horizontal sync signal HS generated by the video processor 1504. I/O interface 1512 couples the output of MUX 1509 to the line 310 used by conventional display devices for communicating the horizontal sync signal. Thus, during unencrypted mode operation the horizontal sync signal is output in a conventional manner while during encrypted mode, the horizontal sync information is incorporated into the video signals and the horizontal sync line 310 is used to convey the fourth encoded video signal UV'.

Figure 16:
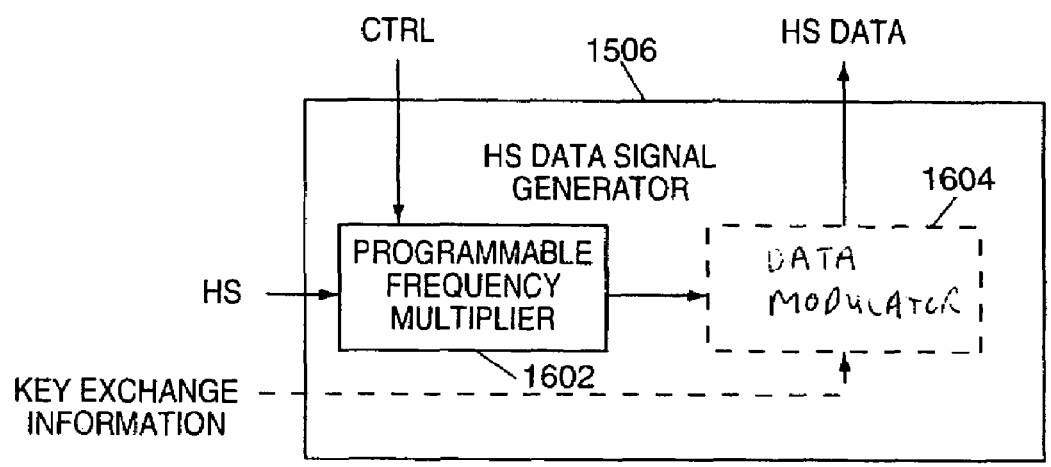
FIG. 16 illustrates a horizontal synchronization data signal generator suitable for use in the display adapter of FIG. 15.

FIG. 16 illustrates an exemplary horizontal synchronization data signal generator 1506. The generator 1506 includes a programmable frequency multiplier 1602 and an optional data modulator 1604. The programmable frequency multiplier 1602 generates, from the conventional horizontal synchronization signal HS and timing information included in the CTRL signal a horizontal synchronization data signal HS DATA. In some cases, information, e.g., key exchange information, to be supplied to the display device is modulated on the HS data signal so that it will be incorporated into the modulated video signals along with the horizontal synchronization information. In this manner, additional information can be conveyed to the display device via the video signals.

Figure 17:
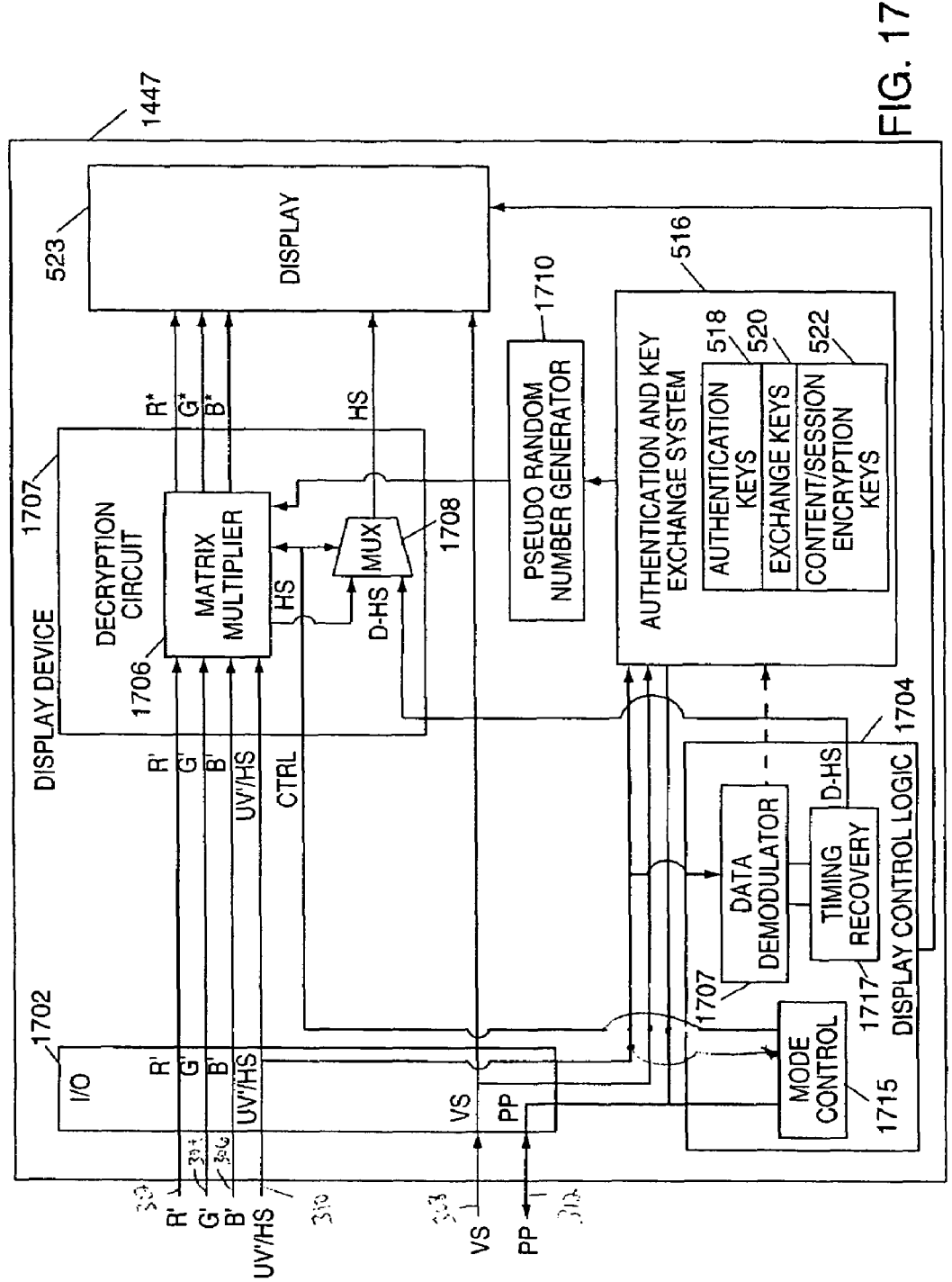
FIG. 17 illustrates a display device suitable for use as the display device shown in FIG. 14.

FIG. 17 illustrates a display device 1447 which may be used as the display device of FIG. 14. The display device 1447 comprises an I/O interface 1702, display control logic 1704, decryption circuit 1706, pseudo random number generator 1710, display 523 and an authentication and key exchange system 516. The display 523 and authentication and key exchange system 516 operate as previously described with regard to the FIG. 5 embodiment.

I/O interface 1702 is coupled to lines 302, 204, 306, 310, 308 and 312. Thus, the I/O interface 1702 receives the analog video signals R', G', B', either the fourth encrypted analog video signal UV' or the horizontal synchronization signal HS, the vertical synchronization signal VS, and the plug-play signal PP.

The I/O interface 1702 links the plug and play line 312 to the display control logic and the authentication and key exchange system 518. The plug and play line 312 is a bi-directional communication line. Thus, the display control logic 1704 and authentication and key exchange system 516 can exchange information, e.g., display type information, timing information and other information, e.g., relating to the mode of operation to be used at any given time, with the display adapter 1448 over the line 312.

The vertical synchronization line 308 is coupled by the I/O interface 1702 to the display 523 and to the authentication and key exchange system 518. Accordingly, the video adapter 1448 can transmit vertical synchronization information and/or additional information to the display 523 and to the authentication and key exchange system 516 via vertical synchronization line 308.

The UV'/HS signal line 310 is coupled by the I/O interface 1702 to the display control logic 1704, authentication and key exchange system 516, and to the decryption circuit 1707. Thus, the display control logic 1704 receives, along with the encrypted analog video signal UV', the timing and other information included in the video signal during encrypted mode operation.

The first, second and third analog encrypted video signals R', G', B' are supplied via I/O interface 1702 to corresponding inputs of the decryption circuit 1707. Thus, the decryption circuit 1707 receives as its inputs the four encrypted video signals R', G', B' and UV'.

In addition to receiving the four encrypted analog video signals, the decryption circuit receives a control signal from the display control logic used to control whether the display device operates in an unencrypted mode or encrypted mode of operation.

The display control logic includes a mode control circuit which is responsive to signals received via the PP line 302 to place the display device in either an encrypted or unencrypted mode of operation. A mode control signal CTRL generated by the mode control circuit 1715 is used to control the operation of decryption device 1707. The mode control circuit 1707 also includes an optional connection to one of the encrypted video signal lines, e.g., line 310. Accordingly, the model control circuit can monitor the video signal line 310 for the presence of modulated horizontal synchronization information and initiate encrypted mode operation when the sync signal is present and de-activate encrypted mode operation when the horizontal sync signal in the encrypted video signal is lost or not detected.

In addition to the mode control circuit 1715, the display control logic 1704 includes a data demodulator 1707 and a timing recovery circuit 1717. The data demodulator 1707 recovers data, e.g., encryption key and encryption synchronization information, that is modulated on the encrypted video signals in some embodiments. The data recovered by the data demodulator 1707, when present, is supplied to the authentication and key exchange system 516.

The timing recovery circuit 1717 is used to recover the horizontal synchronization information from the encrypted video signal UV' during encrypted mode operation. A demodulated horizontal synchronization signal (D-HS) generated by the timing recovery circuit 1717 is supplied to the video decryption circuit 1707. The timing recovery circuit 1717 may perform DC restoration on the received video signal prior to extracting the horizontal sync data. A zero crossing detector incorporating hysteresis may also be used in implementing the timing recovery circuit 1717. Horizontal sync timing recovery may be further strengthened by integrating several valid horizontal sync pulses into the video signal over a time window and by using other well known techniques.

The video signal decryption circuit 1707 includes a matrix multiplier 1706 and a MUX 1708 both of which are responsive to the mode control signal generated by the display control logic 1704. The matrix multiplier includes R', G' B' and UV'/HS signal inputs.

During unencrypted mode operation, the received signals supplied to the R', G', B' video signal inputs of the matrix multiplier will be the unencrypted analog R, G, and B video signals respectively. Accordingly, during unencrypted mode operation, the matrix multiplier simply passes these signals to its R, G, B signal outputs and thus the corresponding signal inputs of the display 523.

The matrix multiplier 1707 receives the conventional horizontal synchronization signal HS at its UV'/HS signal input during unencrypted mode operation. The received HS signal is supplied to a first data signal input of the MUX 1708. A second data signal input of the MUX 708 is coupled to the D-HS signal output of the display control logic 1704. The output of the MUX 1708 is coupled to the horizontal synchronization signal input of display 523, When the CTRL signal supplied by the model control circuit 1715 to the MUX 1708 indicates unencrypted mode operation, the MUX's first input is coupled to its output. However, during encrypted mode operation, the MUX's second input is coupled to its output. Thus, during unencrypted mode operation the display device 523 is supplied by MUX 1708 with the signal HS received via the UV'/HS line 310. During encrypted mode operation the display 523 will be supplied with the demodulated horizontal synchronization signal, D-HS, generated by the timing recovery circuit 1717.

During encrypted mode operation, the pseudo random number generator 1710 generates a 4×4 set of matrix coefficients as a function of a value supplied by the authentication and key exchange system. The generation of the set of matrix coefficients is synchronized by the authentication and key exchange system 516 so that the same matrix coefficients generated by the display adapter's pseudo random number generator at encoding time will be produced for decoding the received encrypted video signals. The matrix coefficients produced by the pseudo random number generator 1710 are supplied to a coefficient input of matrix multiplier 1706.

During encrypted mode operation, the matrix multiplier performs a matrix multiplication operation on the received R', G' B' and UV' signals which is the inverse of that performed at encoding time. The resulting UV* signal is discarded while the signals R*, G*, B* are supplied to the corresponding red, green and blue signal inputs of display 523. Because of the way in which the horizontal synchronization information was modulated by the display adapter, the presence of the horizontal sync signal information does not interfere with the display of the image by the display device 523, i.e., the horizontal synchronization information will be eliminated as part of an ordinary signal clamping operation performed by the display 523.

In the above described manner, the four encrypted analog video signals R', G', B' and UV' can be decrypted in a relatively simple manner to produce the analog video signals used by the display 523.

Various exemplary embodiments have been described above. In view of the description provided above, various modifications will be apparent to those skilled in the art without deviating from the inventive teachings described and claimed herein.

What is claimed is:

1. A computer-readable media having computer-executable instructions that, when executed on a computer, perform a method of processing first, second, and third signals for use in a system having first, second, third and fourth signal lines, wherein the first, second, and third signal lines couple a source device to a destination device, a pseudo-random number generator being contained within the source device, the method comprising:

operating the source device to communicate with the destination device so as to establish a session key and synchronization information via one or all of the first, second, third and fourth signal lines during a vertical blanking period;

operating the pseudo-random number generator to generate said pseudo-random output values as a function of the established session key;

generating a fourth signal by processing at least one of the first, second or third signals to generate the fourth signal from said at least one of the first, second, or third signals;

generating, using said pseudo-random number generator, pseudo-random output values; and for each of the first, second, third and fourth signal lines, selecting, for transmission thereon, one of the first, second, third, and fourth signals, the selection being performed in a mutually exclusive manner and as a function of at least one of said pseudo-random output values, the selection also being performed by a matrix multiplication operation performed on the first, second, third and fourth signals utilizing matrix coefficients generated from a plurality of the pseudo-random output values, wherein the first, second and third signals are red, green and blue video signals, respectively, the method further comprising the steps of encrypting horizontal synchronization information into at least one of said red, green and blue video signals prior to changing which ones of the first, second, third and fourth signal lines are used to transmit said first, second and third signals.

2. The method of claim 1, wherein generating a fourth signal includes performing the act of:

switching between at least two of said first and second signals to generate said fourth signal.

3. The method of claim 1, wherein generating a fourth signal includes:

performing a high pass filtering operation on one of said first, second and third signals to produce a filtered signal; and combining the filtered signal with a modulated pedestal signal to generate said fourth signal.

4. The method of claim 1, further comprising:

transmitting a horizontal synchronization signal over said fourth line prior to using the fourth line to transmit one of said first, second and third video signals.

5. A computer-readable media having computer-executable instructions that, when executed on a computer, perform a method of processing first, second, and third video signals which are coupling a source device to a destination device, the method comprising:
- generating a fourth video signal;
- operating the source device to communicate with the destination device so as to establish a session key and synchronization information via one or all of the first, second, third and fourth video signal during a vertical blanking period;
- transmitting the first, second, third, and fourth video signals over first, second, third and fourth lines, the transmitting including periodically swapping the lines used to transmit the first, second, third and fourth video signals; and
- modifying at least one of said first, second and third signals prior to transmitting them, the modifying including modulating horizontal synchronization information on each of said first, second, and third video signals,
- wherein periodically swapping the lines used to transmit the first, second, third and fourth video signals includes an act of performing a matrix multiplication operation on the first, second, third, and fourth video signals to determine the line on which each of the video signals are transmitted;
- operating a pseudo random number generator to generate a set of values; and
- wherein said matrix multiplication operation is performed as a function of said set of generated values.

* * * * *